(12) United States Patent (10) Patent No.: US 12,647,220 B2
Park et al. (45) Date of Patent: Jun. 2, 2026

(54) METHOD AND APPARATUS FOR TRANSMISSION OF HARQ-ACK IN WIRELESS COMMUNICATION SYSTEM

(71) Applicant: Samsung Electronics Co., Ltd., Suwon-si (KR)

(72) Inventors: Sungjin Park, Suwon-si (KR); Taehan Bae, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 17/495,689

(22) Filed: Oct. 6, 2021

(65) Prior Publication Data

US 2022/0116158 A1 Apr. 14, 2022

(30) Foreign Application Priority Data

Oct. 8, 2020 (KR) ......................... 10-2020-0130518

(51) Int. Cl.
*H04L 1/1867* (2023.01)
*H04L 1/1812* (2023.01)
(52) U.S. Cl.
CPC .......... *H04L 1/1887* (2013.01); *H04L 1/1812* (2013.01)
(58) Field of Classification Search
CPC ...................................................... H04L 1/1812
See application file for complete search history.

(56) References Cited

U.S. PATENT DOCUMENTS 10,313,062 B2 * 6/2019 Hwang ................. H04L 1/1812
11,831,438 B2 * 11/2023 Noh ...................... H04L 1/1864
(Continued)

FOREIGN PATENT DOCUMENTS

WO WO-2018145074 A1 * 8/2018 ............... H04L 1/08
WO WO-2020040179 A1 * 2/2020 ........... H04L 1/1819
WO 2020057566 A1 3/2020

OTHER PUBLICATIONS

International Search Report and Written Opinion of the International Searching Authority dated Jan. 20, 2022, in connection with International Application No. PCT/KR2021/013664, 7 pages.
(Continued)

*Primary Examiner* — Yemane Mesfin
*Assistant Examiner* — Jia Hao Deng

(57) ABSTRACT

The disclosure may be applied to intelligent services based on the 5G communication technology and the IoT-related technology, such as smart home, smart building, smart city, smart car, connected car, health care, digital education, smart retail, security and safety services. According to an embodiment of the disclosure, a method performed a terminal in a communication system comprising: receiving, from a base station, hybrid automatic repeat request-acknowledgement (HARQ-ACK) codebook information and HARQ-ACK bundling information; receiving, from the base station, downlink control information (DCI) for scheduling a physical downlink shared channel (PDSCH) on a physical downlink control channel (PDCCH); receiving, from the base station, the PDSCH; identifying, based on the HARQ-ACK codebook information and the HARQ-ACK bundling information, first HARQ-ACK information by bundling second HARQ-ACK information for the PDSCH and at least one third HARQ-ACK information; and transmitting, to the base station, the first HARQ-ACK information.

16 Claims, 11 Drawing Sheets

(56) References Cited

U.S. PATENT DOCUMENTS

| | | | |
|---|---|---|---|
| 2017/0366305 A1 | 12/2017 | Hwang et al. | |
| 2019/0149271 A1 | 5/2019 | Yin et al. | |
| 2019/0335447 A1 | 10/2019 | Sarkis et al. | |
| 2020/0213981 A1 | 7/2020 | Park et al. | |
| 2021/0314094 A1 | 10/2021 | Gao | |
| 2022/0158783 A1* | 5/2022 | Matsumura | H04L 5/0032 |
| 2022/0248399 A1* | 8/2022 | You | H04L 5/0096 |

OTHER PUBLICATIONS

LG Electronics, "Support of HARQ-ACK multiplexing/bundling for Nr," R1-1713194, 3GPP TSG RAN WG1 Meeting #90, Prague, Czechia, Aug. 21-25, 2017, 9 pages.

Oppo, "Remaining issues on HARQ-ACK bundling," R1-1800769, 3GPP TSG RAN WG1 Meeting AH 1801, Vancouver, Canada, Jan. 22-26, 2018, 3 pages.

Office Action dated Apr. 1, 2026, in connection with Korean Application No. 10-2020-0130518, 10 pages.

* cited by examiner

START receive higher signal related to HARQ-ACK codebook    ⌇401 determine slot set corresponding to HARQ-ACK transmission slot, and determine candidate PDSCHs in determined slot    ⌇402 determine HARQ-ACK codebook size and codebook location for each candidate PDSCH    ⌇403

END

METHOD AND APPARATUS FOR TRANSMISSION OF HARQ-ACK IN WIRELESS COMMUNICATION SYSTEM

CROSS-REFERENCE TO RELATED APPLICATION

This application is based on and claims priority under 35 U.S.C. § 119(a) of a Korean patent application number 10-2020-0130518, filed on Oct. 8, 2020, in the Korean Intellectual Property Office, the disclosure of which is herein incorporated by reference in its entirety.

BACKGROUND

1. Field

The disclosure relates to a wireless communication system and, more particularly, to a method and apparatus for transmitting a hybrid automatic repeat request-acknowledgement (HARQ-ACK) in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the advance of wireless communication systems as described above, various services can be provided and accordingly there is a need for schemes to efficiently provide these services.

In particular, various research are progressing to enhance the coverage of a transmitting/receiving end.

The above information is presented as background information only to assist with an understanding of the disclosure. No determination has been made, and no assertion is made, as to whether any of the above might be applicable as prior art with regard to the disclosure.

SUMMARY

A physical uplink control channel (PUCCH) is a control channel that a user equipment (UE) transmits to a base station, and an uplink control channel (UCI) may be transmitted via the PUCCH. When the coverage area of the PUCCH is increased, a cell having a broad area may be operated using a smaller number of base stations. Accordingly, there is a desire for a method of increasing the coverage area of a transceiver end.

According to an embodiment of the disclosure, a method performed by a terminal in a communication system is provided. The method of the terminal comprises: receiving, from a base station, hybrid automatic repeat request-acknowledgement (HARQ-ACK) codebook information and HARQ-ACK bundling information; receiving, from the base station, downlink control information (DCI) for scheduling a physical downlink shared channel (PDSCH) on a physical downlink control channel (PDCCH); receiving, from the base station, the PDSCH; identifying first HARQ-ACK information by bundling second HARQ-ACK information for the PDSCH and at least one third HARQ-ACK information based on the HARQ-ACK codebook information and the HARQ-ACK bundling information; and transmitting, to the base station, the first HARQ-ACK information.

According to an embodiment of the disclosure, a method performed by a base station in a communication system is provided. The method of the base station comprises: transmitting, to a terminal, HARQ-ACK codebook information and HARQ-ACK bundling information; transmitting, to the terminal, DCI for scheduling a PDSCH on a PDCCH; transmitting, to the terminal, the PDSCH; and receiving, from the terminal, first HARQ-ACK information, wherein the first HARQ-ACK information is identified by bundling second HARQ-ACK information for the PDSCH and at least one third HARQ-ACK information based on the HARQ-ACK codebook information and the HARQ-ACK bundling information.

According to an embodiment of the disclosure, a terminal in a communication system is provided. The terminal comprises: a transceiver; and a processor configured to: receive, from a base station via the transceiver, HARQ-ACK codebook information and HARQ-ACK bundling information, receive, from the base station via the transceiver, DCI for scheduling a PDSCH on a PDCCH, receive, from the base station via the transceiver, the PDSCH, identify first HARQ-ACK information by bundling second HARQ-ACK information for the PDSCH and at least one third HARQ-ACK information based on the HARQ-ACK codebook information and the HARQ-ACK bundling information, and transmit, to the base station via the transceiver, the first HARQ-ACK information.

According to an embodiment of the disclosure, a base station in a communication system is provided. The base station comprises: a transceiver; and a processor configured to: transmit, to a terminal via the transceiver, HARQ-ACK codebook information and HARQ-ACK bundling information, transmit, to the terminal via the transceiver, DCI for scheduling a PDSCH on a PDCCH, transmit, to the terminal via the transceiver, the PDSCH, and receive, from the terminal via the transceiver, first HARQ-ACK information, wherein the first HARQ-ACK information is identified by bundling second HARQ-ACK information for the PDSCH and at least one third HARQ-ACK information based on the HARQ-ACK codebook information and the HARQ-ACK bundling information.

According to various embodiments of the disclosure, the size of a HARQ-ACK codebook that a UE transmits to a base station may be reduced. Particularly, based on a HARQ-ACK bundling method according to various embodiments of the disclosure, the size of HARQ-ACK information may be reduced. Accordingly, the size of uplink control information (UCI) for transmitting the HARQ-ACK information may be reduced (UCI size reduction) and a cell of a broad area may be operated using a small number of base stations (coverage enhancement).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
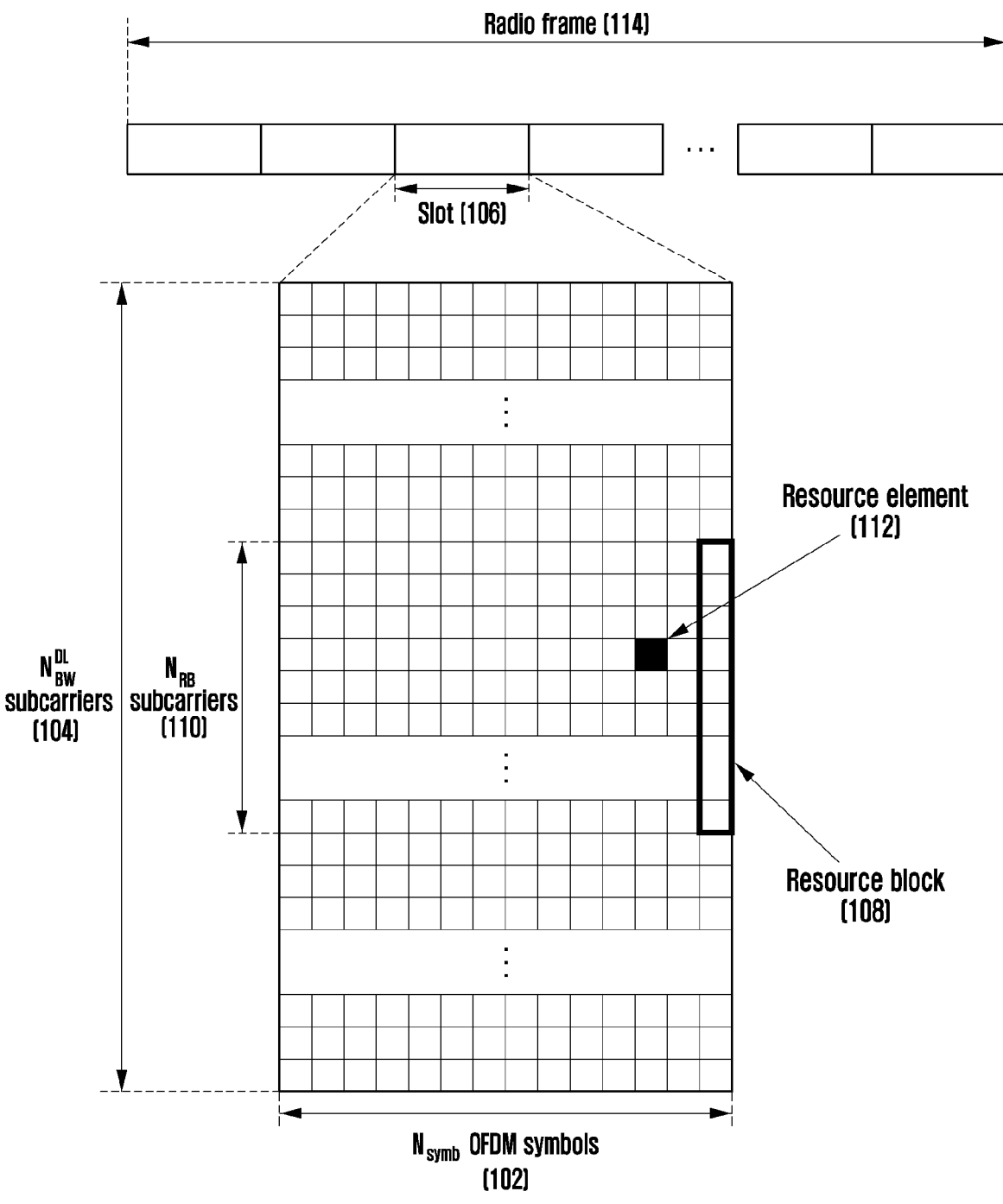
FIG. 1 is a diagram illustrating the transmission structure of a time-frequency domain which is a wireless resource area of a 5G or NR system according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

The terms to be described below are terms defined by taking into consideration functions in the disclosure, and may be changed by a user, intention of an operator, custom, or the like. Therefore, the definitions of the terms should be made on the basis of the contents throughout the specification. Hereinafter, a base station is a subject of performing resource assignment with respect to a user equipment (UE), and may be at least one of a gNode B (gNB), an eNode B (eNB), a Node B, a base station (BS), a wireless access unit, a BS controller, or a node on a network. A terminal may include a user equipment (UE), a mobile station (MS), a cellular phone, a smart phone, a computer, or a multimedia system capable of performing a communication function. In the disclosure, a downlink (DL) is a wireless transmission path of a signal that a base station transmits to a UE. An uplink is a wireless transmission path of a signal that a UE transmits to a base station. In addition, although the disclosure provides description by taking an NR system as an example, the disclosure is not limited thereto and embodiments of the disclosure may be applicable to various communication systems which have similar technical backgrounds or channel formats. In addition, the embodiments of the disclosure may be modified by those skilled in the art without departing from the scope of the disclosure, and may be applied to other communication systems.

In the disclosure, terms "physical channel" and "signal" conventionally used may be interchangeably used with terms "data" or "control signal." For example, although a physical downlink shared channel (PDSCH) is a physical channel via which data is transmitted, the PDSCH in the disclosure may refer to data.

In the disclosure, higher signaling (or high-level signaling) is signal transferring from a base station to a UE via a downlink data channel of a physical layer, or signal transferring from a UE to a base station via an uplink data channel of a physical layer, which may also be referred to as RRC signaling or MAC control element (CE).

In the disclosure, higher signals (or high-level signals) refer to UE-common higher signals such as an MIB or an SIB or UE-specific higher signals such as an RRC or an MAC CE.

In the disclosure, an example of an L1 signal may be a predetermined field in DCI, DCI format information, RNTI information scrambled with a CRC of DCI, or control area resource information via which DCI is transmitted or received.

A wireless communication system has developed to be a broadband wireless communication system that provides a high-speed and high-quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultramobile broadband (UMB), and 802.16e of IEEE, or the like, beyond the voice-based service provided at the initial stage. In addition, communication standard of 5G or new radio (NR) is being developed as a 5G wireless communication system.

A 5G or an NR system, which is a representative example of the broadband wireless communication system, employs an orthogonal frequency division multiplexing (OFDM) scheme in a downlink (DL) and an uplink (UL). Particularly, a cyclic-prefix OFDM (CP-OFDM) is employed for a downlink, and a CP-OFDM scheme and a discrete Fourier transform spreading OFDM (DFT-S-OFDM) scheme are employed for the uplink. The uplink is a radio link via which a user equipment (UE) or a mobile station (MS) transmits data or a control signal to a base station (gNodeB or a base station (BS)). The downlink is a radio link via which a BS transmits data or a control signal to a UE. In the multiple access schemes as described above, time-frequency resources for carrying data or control information are assigned and operated in a manner to prevent overlapping of the resources, that is, to establish the orthogonality, between users, so as to identify data or control information of each user.

The NR system which is a new 5G communication technology is designed to enable various services to be freely multiplexed in time and frequency resources. Accordingly, a waveform/numerology, a reference signal, or the like may be dynamically or freely assigned based on the needs of corresponding service. In order to provide an optimal service to a UE in wireless communication, it is important to optimize data transmission by measuring the quality of a channel and interference. Accordingly, accurate measurement of a channel state is essential. However, unlike 4G communication in which channel and interference characteristics do not significantly change depending on a frequency resource, in the case of the 5G or NR, channel and interference characteristics significantly change depending on a service. Accordingly, a subset needs to be supported from the perspective of a frequency resource group (FRG), so that the channel and interference characteristics are capable of being measured divisionally. The types of services supported in the 5G or the NR system may be categorized as enhanced mobile broadband (eMBB), massive machine type communications (mMTC), ultra-reliable and low-latency communications (URLLC), and the like. eMBB is a service for high-speed transmission of large-capacity data. mMTC is a service for UE power minimization and multi-UE access. URLLC is a service for high reliability and low latency. Different requirements may be applied depending on the type of service applied to a UE. As described above, a plurality of services may be provided to a user in a communication system. In order to provide a plurality of services to a user, there is a desire for a method and apparatus for providing services according to respective characteristics within the same time interval.

Among the above-described eMBB, mMTC, URLLC services, the URLLC service aims to have high-reliability and low-latency and thus, there is a desire for transmitting control information and data information which is capable of being transmitted via a physical channel with a low coding rate. In the case of control information, the MTC of LTE or a narrow band Internet-of-things (NB-IoT) service has adopted a function of repeatedly transmitting control information. However, this is to provide a large coverage area for UEs having narrow bandwidths, and requirements associated with a latency time has been insufficiently considered. In addition, the minimum unit for repetitive transmission of control information is fixedly set to a subframe unit in LTE. Employing of a repetitive control information transmission mode is needed, which requires a low latency time and increases reliability in order to support a URLLC service in the NR or 5G system. Accordingly, various embodiments of the disclosure may be applicable when control information is repeatedly transmitted in a slot. In addition, various embodiments of the disclosure may be applicable when control information is repeatedly transmitted over slots. Through the above, a UE may be capable of detecting control information transmitted from a base station quickly with high reliability.

For high reliability associated with data (or information) transmission or reception, the 5G or NR system adopts a HARQ scheme that retransmits corresponding data in a physical layer if decoding fails at the initial transmission. The HARQ scheme refers to a scheme that enables a receiver to transmit, to a transmitter, information (negative acknowledgement (NACK)) indicating the failure of decoding when the receiver does not successfully decode data, so that the transmitter retransmits the corresponding data in a physical layer. The receiver may combine data retransmitted from the transmitter and previous data, decoding of which has failed, whereby data reception performance may increase. In addition, when the receiver accurately decodes data, the receiver transmits information (acknowledgement (ACK)) reporting that decoding is successfully executed, so that the transmitter transmits new data.

Hereinafter, a method and apparatus for transmitting a HARQ-ACK feedback by a UE with respect to downlink data transmission, to which the disclosure is applicable, will be described. Particularly, a method of configuring HARQ-ACK feedback bits if a UE desires to transmit a multi-HARQ-ACK within a single slot in an uplink is described.

In a wireless communication system, particularly, in a new radio (NR) system, a base station may configure a single component carrier (CC) or a plurality of CCs in order to perform downlink transmission to a UE. In addition, downlink and uplink transmission slots and symbols may be configured in each CC. If a physical downlink shared channel (PDSCH) which is downlink data is scheduled, at least one piece of information among information associated with a slot timing at which the PDSCH is mapped, the location of a start symbol to which the PDSCH is mapped in the corresponding slot, and information associated with the number of symbols to which the PDSCH is mapped may be transferred in a predetermined bit field of downlink control information (DCI). For example, in the case in which DCI is transferred at slot n and a PDSCH is scheduled, if K0 which is slot timing information at which the PDSCH is transferred is 0, the location of a start symbol is 0, and the length of symbols is 7, the corresponding PDSCH is mapped to 7 symbols from symbol 0 in slot n. A HARQ-ACK feedback may be transferred from the UE to the base station K1 slots after the PDSCH which is a downlink data signal is transmitted. K1 information associated with timing information at which a HARQ-ACK is transmitted may be transferred in DCI. A set of K1 candidate values may be transferred via higher signaling and one of them may be determined via the DCI.

If a UE is configured with a semi-static HARQ-ACK codebook, the UE may determine feedback bits (or a feedback bit size or a HARQ-ACK codebook size) to be transmitted based on a table including K0 which is information associated with a slot to which a PDSCH is mapped, start symbol information, and the number of symbols or length information, and K1 candidates which are HARQ-ACK feedback timing information associated with the PDSCH. The table including slot information associated with a slot to which the PDSCH is mapped, start symbol information, the number of symbols or length information may include a default value. In addition, there may be a table that a base station configured for a UE.

If a UE is configured with a dynamic HARQ-ACK codebook, the UE may determine a slot in which HARQ-ACK information is to be transmitted based on K0 which is slot information associated with a slot to which a PDSCH is mapped, and K1 which is HARQ-ACK feedback timing information associated with the PDSCH, and may determine HARQ-ACK feedback bits (or a HARQ-ACK feedback bit size or a HARQ-ACK codebook size) to be transmitted by the UE in the determined slot based on downlink assignment indicator (DAI) information included in DCI.

According to an embodiment of the disclosure, there is provided a method and apparatus for configuring a HARQ-ACK codebook in the state in which a UE performs HARQ-ACK transmission more than one time in one slot.

FIG. 1 is a diagram illustrating the transmission structure of a time-frequency domain which is a wireless resource area of a 5G or NR system according to various embodiments of the present disclosure.

Referring to FIG. 1, in a wireless resource area, the horizontal axis is the time domain and the vertical axis is the frequency domain. In the time domain, the minimum transmission unit is an OFDM symbol, and a single slot 116 includes Nsymb OFDM symbols 112. The length of a subframe may be defined as 1.0 ms and a radio frame 114 may be defined as 10 ms. In the frequency domain, the minimum transmission unit is a subcarrier. The entire system transmission bandwidth may include a total of NBW subcarriers 114. The detailed figures may be variably applied depending on a system.

In the time-frequency domain, the basic unit is a resource element (RE) 112, and an RE is expressed by an OFDM symbol index and a subcarrier index. A resource block (RB)108 or a physical resource block (PRB) may be defined by Nsymb consecutive OFDM symbols 112 in the time domain and NRB consecutive subcarriers 110 in the frequency domain. Therefore, one RB 108 includes Nsymb× NRB REs 112.

Generally, the minimum transport unit of data is an RB. In the 5G or NR system, Nsymb=14 and NRB=12, generally, and NBW and NRB may be proportional to the bandwidth of a system transmission band. A data rate may increase in proportional to the number of RBs scheduled for a UE. In the 5G or NR system, a downlink transmission bandwidth and an uplink transmission bandwidth may be different from each other in the case of an FDD system that operates a downlink and an uplink based on a frequency. A channel bandwidth may indicate an RF bandwidth corresponding to a system transmission bandwidth. Table 1 below shows the correspondence relationship between a system transmission bandwidth and a channel bandwidth defined in an LTE system which is 4th generation wireless communication before a 5G or NR system. For example, in the case of an LTE system that has a channel bandwidth of 10 MHz, the transmission bandwidth may include 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ [MHz] | 6 | 15 | 25 | 50 | 75 | 100 |

The 5G or NR system may operate in a channel bandwidth broader than the channel bandwidth of the LTE shown in Table 1. Table 2 shows the correspondence relationship between a system transmission bandwidth, a channel bandwidth, and a subcarrier spacing (SCS) in the 5G or NR system.

TABLE 2

| | SCS | Channel bandwidth $BW_{Channel}$ [MHz] | | | | | | | | | |
|---|---|---|---|---|---|---|---|---|---|---|---|
| | [kHz] | 5 | 10 | 15 | 20 | 25 | 40 | 50 | 60 | 80 | 100 |
| Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G or NR system, scheduling information associated with downlink data or uplink data may be transmitted from a base station to a UE via downlink control information (DCI). DCI is defined based on various formats. Depending on each format, DCI indicates whether scheduling information is scheduling information (UL grant) for uplink data or scheduling information (DL grant) for downlink data, whether the size of control information is small compact DCI, whether spatial multiplexing using multiple antennas is applied, whether DCI is for the purpose of power control, or the like. For example, DCI format 1-1 which is the scheduling control information (DL grant) for downlink data may include at least one of the following pieces of control information:

Carrier indicator indicating a frequency carrier on which transmission is performed;

DCI format indicator indicating whether corresponding DCI is for a downlink or an uplink;

Bandwidth part (BWP) indicator indicating a BWP in which transmission is performed;

Frequency domain resource assignment indicating an RB of the frequency domain, assigned to data transmission. An expressed resource is determined based on a system bandwidth and a resource assignment scheme;

Time domain resource assignment indicating at which OFDM symbol of which slot a data-related channel is to be transmitted;

VRB-to-PRB mapping indicating a mapping scheme used for mapping between a virtual RB (VRB) index and a physical RB (PRB) index;

Modulation and coding scheme (MCS) indicating a modulation scheme and a coding rate used for data transmission. That is, this indicates a coding rate value indicating channel coding information and a transport block size, together with information associated with whether a modulation scheme is quadrature phase shift keying (QPSK), 16 quadrature amplitude modulation (QAM), 64 QAM, or 256 QAM;

Codeblock group (CBG) transmission information indicating information associated with a CBG to be transmitted if CBG retransmission is configured;

HARQ process number indicating the process number of HARQ;

New data indicator indicating HARQ initial transmission or HARQ retransmission;

Redundancy version indicating the redundancy version of HARQ; or

Transmit power control (TPC) command for physical uplink control channel (PUCCH) indicating a transmission power control command for a PUCCH which is an uplink control channel.

In the case of data transmission via a PUSCH, time domain resource assignment may be delivered via information associated with a slot in which a PUSCH is transmitted, a start OFDM symbol location S in the corresponding slot, and the number L of OFDM symbols to which the PUSCH is mapped. Herein, S is the relative location from the start of a slot. L denotes the number of consecutive OFDM symbols. S and L may be determined based on a start and length indicator value (SLIV) defined as shown in TABLE 3.

TABLE 3

| If (L−1) ≤ 7 then |
| --- |
| SLIV = 14·(L−1)+S |
| else |
| SLIV = 14·(10−L+1)+(10−1−S) |
| where 0 < L ≤ 14−S |

In the 5G or NR system, a UE may be configured with a table including information associated with an SLIV value, a PUSCH mapping type, and a slot in which a PUSCH is transmitted, in one row, via RRC configuration by a base station. Subsequently, in the time domain resource assignment of the DCI, by indicating an index value in the configured table, a base station may transfer, to a UE, information associated with an SLIV value, a PUSCH mapping type, and a slot in which a PUSCH is transmitted.

In the 5G or NR system, a PUSCH mapping type may include type A and type B. According to PUSCH mapping type A, the first OFDM symbol of DMRS OFDM symbols may be located in the second or third OFDM symbol in a slot. According to PUSCH mapping type B, the first OFDM symbol of DMRS OFDM symbols may be located in the first OFDM symbol in the time domain resource assigned via PUSCH transmission. The above-described PUSCH time domain resource assignment method may be equally applicable to the PDSCH time domain resource assignment.

DCI may pass through a channel coding and modulation process and may be transmitted in a physical downlink control channel (PDCCH) (or control information, hereinafter, both are interchangeably used).

Generally, the DCI is scrambled with a predetermined radio network temporary identifier (RNTI) (or a UE identifier), independently for each UE, a cyclic redundancy check (CRC) is added, and channel coding is performed, whereby each independent PDCCH is configured and transmitted. The PDCCH may be mapped to a control resource set configured for the UE and may be transmitted.

Downlink data may be transmitted via a physical downlink shared channel (PDSCH) which is a physical channel for downlink data transmission. A PDSCH may be transmitted after the control channel transmission interval. The scheduling information such as a detailed mapping location in the frequency domain, a modulation scheme, and the like may be determined based on DCI transmitted via a PDCCH.

Via an MCS in the control information included in the DCI, a base station may report a modulation scheme applied to a PDSCH to be transmitted to a UE, and the size (transport block size (TBS)) of data to be transmitted. In an embodiment, the MCS may include 5 bits, or may include more or fewer bits than 5 bits. The TBS corresponds to a size before channel coding for error correction is applied to data (transport block (TB)) that the base station desires to transmit.

In the disclosure, a transport block (TB) may include a medium access control (MAC) header, a MAC control element (CE), one or more MAC service data units (SDU), and padding bits. Alternatively, the TB may indicate a unit of data or a MAC protocol data unit (PDU) that is delivered from a MAC layer to a physical layer.

The modulation scheme supported by the 5G or NR system includes quadrature phase shift keying (QPSK), 16 quadrature amplitude modulation (16QAM), 64QAM, and 256QAM. Modulation orders (Qm) thereof correspond to 2, 4, 6, and 8, respectively. That is, in the case of QPSK modulation, 2 bits are transmitted per symbol. In the case of 16QAM modulation, 4 bits are transmitted per symbol. In the case of 64QAM modulation, 6 bits are transmitted per symbol. In the case of 256QAM modulation, 8 bits are transmitted per symbol.

In the 5G or NR system, in the case in which a PDSCH or a PUSCH are scheduled by DCI, if a time resource assignment field included in the DCI indicates index m, a UE may obtain a combination of DRMS type A position information, PDSCH mapping type information, a slot index K0, a data resource start symbol S, and a data resource assignment length L which correspond to m+1 from the table indicating the time domain resource assignment information. For example, Table 4A includes time domain resource assignment information.

TABLE 4A

| Normal cyclic prefix-based PDSCH time domain resource assignment | | | | | |
| --- | --- | --- | --- | --- | --- |
| Row Index | dmrs-TypeA-Position | PDSCH mapping type | $K_0$ | S | L |
| 1 | 2 | TypeA | 0 | 2 | 12 |
|  | 3 | TypeA | 0 | 3 | 11 |
| 2 | 2 | TypeA | 0 | 2 | 10 |
|  | 3 | TypeA | 0 | 3 | 9 |
| 3 | 2 | TypeA | 0 | 2 | 9 |
|  | 3 | TypeA | 0 | 3 | 8 |
| 4 | 2 | TypeA | 0 | 2 | 7 |
|  | 3 | TypeA | 0 | 3 | 6 |
| 5 | 2 | TypeA | 0 | 2 | 5 |
|  | 3 | TypeA | 0 | 3 | 4 |
| 6 | 2 | TypeB | 0 | 9 | 4 |
|  | 3 | TypeB | 0 | 10 | 4 |
| 7 | 2 | TypeB | 0 | 4 | 4 |
|  | 3 | TypeB | 0 | 6 | 4 |
| 8 | 2, 3 | TypeB | 0 | 5 | 7 |
| 9 | 2, 3 | TypeB | 0 | 5 | 2 |
| 10 | 2, 3 | TypeB | 0 | 9 | 2 |
| 11 | 2, 3 | TypeB | 0 | 12 | 2 |
| 12 | 2, 3 | TypeA | 0 | 1 | 13 |
| 13 | 2, 3 | TypeA | 0 | 1 | 6 |
| 14 | 2, 3 | TypeA | 0 | 2 | 4 |
| 15 | 2, 3 | TypeB | 0 | 4 | 7 |
| 16 | 2, 3 | TypeB | 0 | 8 | 4 |

In Table 4A, dmrs-typeA-Position is a field indicating the location of a symbol in which a DMRS is transmitted in one slot indicated by a system information block (SIB) which is one of UE-common control information. The available value of the corresponding field may be 2 or 3. If the number of symbols included in one slot is a total of 14, and a first symbol index is 0, 2 indicates a third symbol, and 3 indicates a fourth symbol. In Table 4A, the PDSCH mapping type is information indicating the location of a DMRS in a scheduled data resource area. If the PDSCH mapping type is A, a DMRS may be transmitted or received in a symbol location determined by dmrs-typeA-Position, irrespective of an allocated data time domain resource. If the PDSCH mapping type is B, a DMRS may be transmitted or received always at a first symbol in an allocated data time domain resource. In other words, the PDSCH mapping type B may not use dmrs-typeA-Position information.

In Table 4A, K0 denotes an offset between a slot index to which a PDCCH that transmits DCI belongs to and a slot index to which a PDSCH or PUSCH scheduled by the corresponding DCI belongs. For example, if the slot index of a PDCCH is n, the slot index of a PDSCH or PUSCH scheduled by DCI is n+K0. In Table 4A, S denotes the start symbol index of a data time domain resource in one slot. Available S values may be in the range of 0 to 13 in the case of a normal cyclic prefix. In Table 4A, L denotes the length of a data time domain resource section in one slot. The available L values is in the range of 1 to 14. According to an embodiment, an available S and an available L may be determined based on Equation 1 and Table 5 or Table 6. Table 4A may be values that a UE uses as default values before receiving time resource assignment information via UE-specific or UE-common higher signaling. For example, DCI format 0_0 or 1_0 may use Table 4A as a default time resource domain value.

Table 4A is a PDSCH time domain resource assignment value, and K1 value may replace K2 value for PUSCH time domain resource assignment. Table 4B is an example of a PUSCH time domain resource assignment table.

TABLE 4B

Normal cyclic prefix-based PDSCH time domain resource assignment

| Row Index | PUSCH mapping type | $K_2$ | S | L |
|---|---|---|---|---|
| 1 | TypeA | j | 0 | 14 |
| 2 | TypeA | j | 0 | 12 |
| 3 | TypeA | j | 0 | 10 |
| 4 | TypeB | j | 2 | 10 |
| 5 | TypeB | j | 4 | 10 |
| 6 | TypeB | j | 4 | 8 |
| 7 | TypeB | j | 4 | 6 |
| 8 | TypeA | j + 1 | 0 | 14 |
| 9 | TypeA | j + 1 | 0 | 12 |
| 10 | TypeA | j + 1 | 0 | 10 |
| 11 | TypeA | j + 2 | 0 | 14 |
| 12 | TypeA | j + 2 | 0 | 12 |
| 13 | TypeA | j + 2 | 0 | 10 |
| 14 | TypeB | j | 8 | 6 |
| 15 | TypeA | j + 3 | 0 | 14 |
| 16 | TypeA | j + 3 | 0 | 10 |

$$\text{if } (L-1) \le 7 \text{ then} \qquad\qquad \text{Equation 1}$$

$$SLIV = 14 \cdot (L-1) + S$$

$$\text{else}$$

$$SLIV = 14 \cdot (14 - L + 1) + (14 - 1 - S)$$

$$\text{where } 0 < L \le 14 - S.$$

Table 5 shows a combination of an available S and an available L depending on whether a cyclic prefix is normal cyclic prefix or an extended cyclic prefix, and whether a PDSCH mapping type is type A or type B.

TABLE 5

A combination of S and L to which a PDSCH time domain resource assignment is available

| PDSCH mapping type | Normal cyclic prefix | | | Extended cyclic prefix | | |
|---|---|---|---|---|---|---|
| | S | L | S + L | S | L | S + L |
| TypeA | {0, 1, 2, 3} (Note 1) | {3, . . . , 14} | {3, . . . , 14} | {0, 1, 2, 3} (Note 1) | {3, . . . 12} | {3, . . . , 12} |
| TypeB | {0, . . . , 12} | {2, . . . , 14} | {2, . . . , 14} | {0, . . . , 10} | {2, 4, 6} | {2, . . . , 12} |

Note 1:
S = 3 is applicable only if dmrs-TypeA-Position = 3

Table 6 shows a combination of an available S and an available L depending on whether a cyclic prefix is normal cyclic prefix or an extended cyclic prefix, and whether a PUSCH mapping type is type A or type B.

TABLE 6

A combination of S and L to which a PUSCH time domain resource assignment is available

| PUSCH mapping type | Normal cyclic prefix | | | Extended cyclic prefix | | |
|---|---|---|---|---|---|---|
| | S | L | S + L | S | L | S + L |
| TypeA | 0 | {4, . . . , 14} | {4, . . . , 14} | 0 | {4, . . . 12} | {4, . . . , 12} |
| TypeB | {0, . . . , 13} | {1, . . . , 14} | {1, . . . , 14} | {0, . . . , 12} | {0, . . . , 12} | {1, . . . , 12} |

In Table 4A, each index is configured via PDSCH-TimeDomain ResourceAllocationList or PUSCH-TimeDomainResourceAllocationList, which is a higher signaling parameter.

PDSCH-TimeDomainResourceAllocationList includes PD SCH-TimeDomainResourceAllocati on which is one or multiple higher signaling parameters, and PDSCH-TimeDomainResourceAllocation may include k0, mappingtype, and startSymbolAndLength. The available k0 values is in the range of 0 to 32. Mappingtype may be type A or type B. The available values of StartSymbolAndLength is in the range of 0 to 127. As described above, if mappingtype is type A, the location of a symbol for a DMRS may be determined based on a value indicated by dmrs-typeA-Position.

PUSCH-TimeDomainResourceAllocationList may include PUSCH-TimeDomainResourceAllocation which is one or multiple higher signaling parameters, and PUSCH-TimeDomainResourceAllocation includes k0, mapping type, startSymbolAndLength. The available k0 values is in the range of 0 to 32. Mappingtype may be type A or type B. The available values of StartSymbolAndLength is in the range of 0 to 127. As described above, if mappingtype is type A, the location of a symbol for a DMRS may be determined based on a value indicated by dmrs-typeA-Position.

The above-described PDSCH-TimeDomainResourceAllocation or PUSCH-TimeDomainResource Allocation may be a method for a PDSCH or PUSCH time domain resource assignment in one slot. Higher signaling aggregationFactorDL denotes the number of slots in which a PDSCH-TimeDomainResourceAllocation value applied to one slot is repeatedly transmitted. Higher signaling aggregationFactorUL denotes the number of slots in which a PUSCH-TimeDomainResourceAllocation value applied to one slot is repeatedly transmitted. The range of available values of aggregationFactorDL and aggregationFactorUL is {1, 2, 4, 8}. For example, if aggregationFactorDL is 8, one of the available pieces of PDSCH-TimeDomainResourceAllocation is repeatedly transmitted over a total of 8 slots. In this instance, if at least some of the symbols applied to PDSCH-TimeDomainResourceAllocation in a predetermined slot correspond to uplink symbols, PDSCH transmission or reception in the corresponding slot may be omitted. Alternatively, if at least some of the symbols applied to PUSCH-TimeDomainResourceAllocation in a predetermined slot correspond to downlink symbols, PUSCH transmission or reception in the corresponding slot may be omitted.

Figure 2:
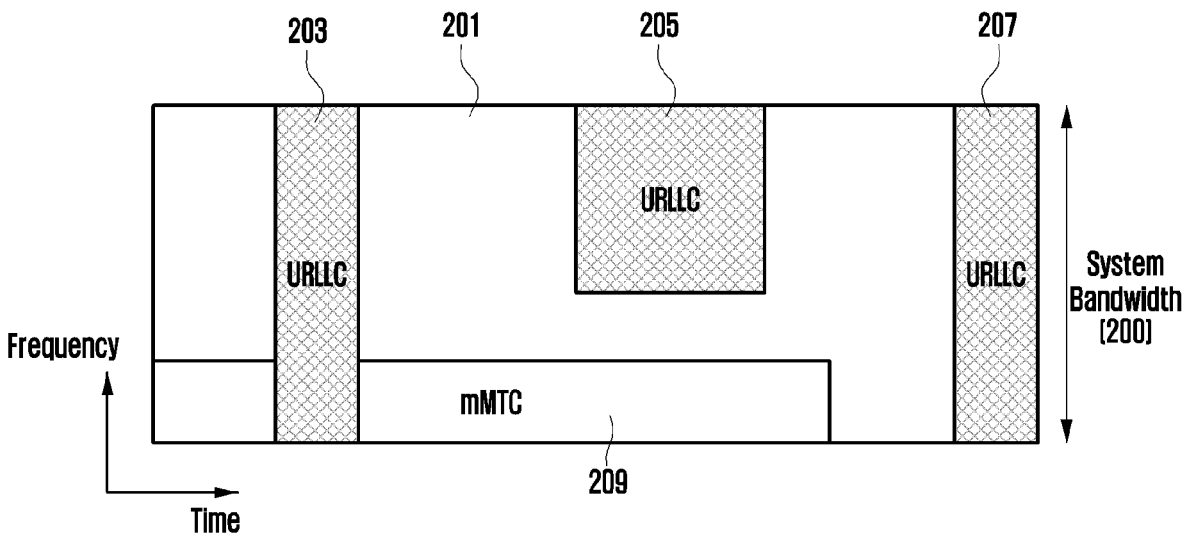
FIG. 2 is a diagram illustrating a method of assigning, to a time-frequency resource area, data for eMBB, URLLC, and mMTC in a 5G or NR system according to various embodiments of the present disclosure.

FIG. 2 is a diagram illustrating a method of allocating, to a time-frequency resource area, data for eMBB, URLLC, and mMTC in the 5G or NR system according to various embodiments of the present disclosure.

Referring to FIG. 2, data for eMBB, URLLC, and mMTC may be allocated in the entire system frequency band 200. If URLLC data 203, 205, and 207 is produced and needs to be transmitted, while eMBB 201 and mMTC 209 are assigned and transmitted in a predetermined frequency band, eMBB 201 and mMTC 209 may empty previously assigned parts or may not perform transmission so that the URLLC data 203, 205, and 207 may be transmitted. Among the above-described eMBB, mMTC, and URLLC services, URLLC needs to reduce a latency time and thus, URLLC data may be assigned to part of resources to which eMBB or mMTC is assigned, and may be transmitted. If URLLC is additionally assigned and transmitted in the resource to which eMBB is assigned, eMBB data may not be transmitted in the overlapping frequency-time resources. Accordingly, the performance of transmission of the eMBB data may be decreased. That is, the transmission of the eMBB data may fail due to the allocation of URLLC. Therefore, various embodiments of the disclosure may be applied even when transmission of eMBB, mMTC, or URLLC data fails. Although the description has been provided with reference to three types of services and three types of data, there are various types of services and data corresponding thereto. In this instance, the disclosure may also be applicable.

Hereinafter, a method of configuring a HARQ-ACK codebook in the 5G system according to an embodiment of the disclosure will be described. In 5G NR, a HARQ-ACK codebook may be configured as type 1 HARQ-ACK codebook and type 2 HARQ-ACK codebook. Type 1 HARQ-ACK codebook is a semi-static HARQ-ACK codebook, and the size of the HARQ-ACK codebook may be determined based on a configuration via higher signal. Therefore, the size of the HARQ-ACK codebook is not changed by a L1 signal. Type 2 HARQ-ACK codebook is a dynamic HARQ-ACK codebook, and the size of the HARQ-ACK codebook may be determined based on a higher signal and an L1 signal. Particularly, the size of the HARQ-ACK codebook may be dynamically determined by an L1 signal. Therefore, type 2 HARQ-ACK codebook may have a size smaller than that of type 1 HARQ-ACK codebook. However, if a UE misses an L1 signal transmitted from a base station, the base station and the UE may determine different HARQ-ACK codebook sizes, and thus, type 2 HARQ-ACK codebook may have lower reliability than that of type 1 HARQ-ACK codebook.

Hereinafter, a method of determining a semi-static HARQ-ACK codebook (type 1 HARQ-ACK codebook) will be described with reference to FIG. 3.

Figure 3:
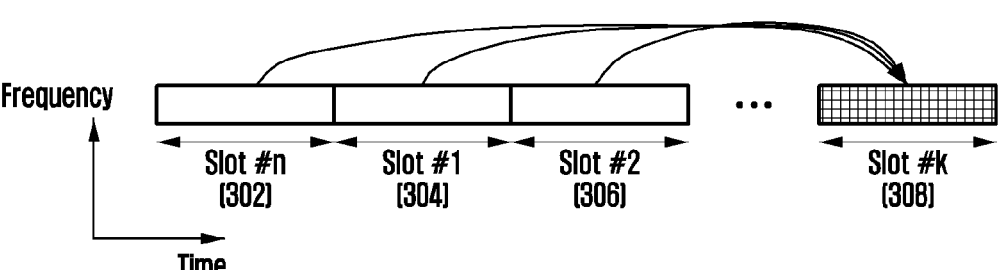
FIG. 3 is a diagram illustrating a method of determining a semi-static HARQ-ACK codebook in a 5G or NR system according to various embodiments of the present disclosure.

FIG. 3 is a diagram illustrating a method of determining a semi-static HARQ-ACK codebook in the 5G or NR system according to various embodiments of the present disclosure.

In the situation in which a HARQ-ACK PUCCH that a UE is capable of transmitting in one slot is limited to one, if the UE receives a semi-static HARQ-ACK codebook configuration via a higher signal, the UE may report (transmit) HARQ-ACK information in a HARQ-ACK codebook in association with PDSCH reception or SPS PDSCH release in a slot indicated by the value of a PDSCH-to-HARQ feedback timing indicator included in DCI format 1_0 or DCI formation 1_1.

In the disclosure, the HARQ-ACK information may include a bit value indicating at least one of "ACK," "NACK," or "DTX (detection)." For example, the UE may map "1" as a HARQ-ACK information bit for ACK, and may map "0" as a HARQ-ACK information bit for NACK. DTX may be regarded as the same value as the NACK. ACK indicates the case in which a UE successfully demodulates/decodes data, and NACK indicates the case in which a UE fails demodulating/decoding of data. DTX corresponds to a situation that may occur when a UE fails to receive DCI that schedules a PDSCH, and indicates the case in which the UE does not discover any control information or data information. The UE may report the HARQ-ACK information bit value in the HARQ-ACK codebook as a NACK in a slot that is not indicated by a PDSCH-to-HARQ feedback timing indicator field in DCI format 1_0 or DCI format 1_1. If the UE reports HARQ-ACK information associated with one SPS PDSCH release or one PDSCH reception, among candidate PDSCH reception occasions (MA,C), and the report is scheduled by DCI format 1_0 including information associated with a counter DACI field indicating 1, the UE may determine a single HARQ-ACK codebook for the corresponding SPS PDSCH release or the corresponding PDSCH reception.

Hereinafter, a method of determining a HARQ-ACK codebook will be described in detail.

If a set of candidate PDSCH reception occasions (candidate PDSCH occasion) in a serving cell c is $M_{A,c}$, $M_{A,c}$ may be obtained according to the steps of [pseudo-code 1].

TABLE 7

[pseudo-code 1 start]
Step 1: initializes j to 0, and $M_{A,c}$ to an empty set. Initialize k which is a HARQ-ACK transmission timing index to 0.
Step 2: R is set to a set of rows in a table including slot information associated with a slot to which a PDSCH is mapped, start symbol information, the number of symbols or length information. If a symbol indicated by each value of R as a symbol to which a PDSCH is capable of being mapped is set to a UL symbol according to configured DL and UL configurations, the corresponding row is deleted from R.
Step 3-1: If a UE is capable of receiving a single unicast PDSCH in one slot, and R is not an empty set, add one occasion to $M_{A,c}$.
Step 3-2: If the UE is capable of receiving one or more unicast PDSCHs in one slot, count the number of PDSCHs capable of being assigned to different symbols in the calculated R, and add as many occasions as the counted number to $M_{A,c}$.
Step 4: increases k by 1, and restarts from step 2.
[pseudo code 1 end]

Describing the above-described pseudo-code 1 with reference to FIG. 3, in order to perform HARQ-ACK PUCCH transmission in slot #k 308, all slot candidates available for a PDSCH-to-HARQ-ACK timing that is capable of indicating slot #k 308 may be considered. Although it is assumed, in FIG. 3, that HARQ-ACK transmission associated with PDSCHs are available in the slot #k 308 by a combination of PDSCH-to-HARQ-ACK timings that are available only for PDSCHs scheduled in slot #n 302, slot #n+1 304, and slot #n+2 306, this is merely an example for ease of description, and the disclosure is not limited thereto. The UE may obtain the maximum number of PDSCHs capable of being scheduled for each slot by taking into consideration time domain resource configuration information of a PDSCH capable of being scheduled in each of slot #n 302, slot #n+1 304, and slot #n+2 306, and information indicating whether a symbol in a slot corresponds to a downlink or an uplink. For example, if it is assumed that the maximum number of PDSCHs capable of being scheduled is 2 PDSCHs in slot #n 302, 3 PDSCHs in slot #n+1 304, and 2 PDSCHs in slot #n+2 306, respectively, the maximum number of PDSCHs capable of being transmitted in slot #k 308, which is included in a HARQ-ACK codebook, may be 7. This is referred to as the cardinality of the HARQ-ACK codebook.

Particularly, the semi-static HARQ-ACK codebook may be determined according to [pseudo-code 2].

TABLE 8

[pseudo-code 2 start]
Set j = 0 - index of occasion for candidate PDSCH reception or SPS PDSCH release
Set B = Ø
Set $M_{A,c}$ = Ø
Set $\mathcal{C}$ ($K_1$) to the cardinality of set $K_1$
Set k = 0 – index of slot timing values $K_{1,k}$, in descending order of the slot timing values, in set $K_1$ for serving cell $\mathcal{C}$
If a UE is not provided ca-SlotOffset for any serving cell of PDSCH receptions and for the serving cell of corresponding PUCCH transmission with HARQ-ACK information while k < $\mathcal{C}$ ($K_1$)
    if mod ($n_U - K_{1,k} + 1$, max ($2^{\mu_{UL}-\mu_{DL}}$, 1)) = 0
        Set $n_D$ = 0 - index of a DL slot within an UL slot
        while $n_D$ < max($2^{\mu_{DL}-\mu_{UL}}$,1)

TABLE 8-continued

Set R to the set of rows
Set $\mathcal{C}$ (R) to the cardinality of R
Set r = 0 - index of row in set R
if slot $n_U$ starts at a same time as or after a slot for an active DL BWP change on serving cell c or an active UL BWP change on the PCell and slot $\lfloor (n_U - K_{1,k}) \cdot 2^{\mu_{DL}-\mu_{UL}} \rfloor + n_D$ is before the

TABLE 8-continued slot for the active DL BWP change on serving cell c or the active UL BWP change on the PCell
    $n_D$ = $n_D$ + 1;
else
    while r < $\mathcal{C}$ (R)
        if the UE is provided tdd-UL-DL-ConfigurationCommon,
        or tdd-UL-DL-ConfigurationDedicated and, for each
        slot from slot $\lfloor (n_U - K_{1,k}) \cdot 2^{\mu_{DL}-\mu_{UL}} \rfloor + n_D$ –
        $N_{PDSCH}^{repeat,max}$ + 1 to slot $\lfloor (n_U - K_{1,k}) \cdot 2^{\mu_{DL}-\mu_{UL}} \rfloor$ +
        $n_D$, at least one symbol of the PDSCH time resource
        derived by row r is configured as UL where $K_{1,k}$ is the
        k-th slot timing value in set $K_1$,
            R = R\r ;
        else
            r = r + 1 ;
        end if
    end while
    if the UE does not indicate a capability to receive more than
    one unicast PDSCH per slot and R ≠ Ø ,
        $M_{A,c}$ = $M_{A,c}$ ∪ j ;
        j = j + 1 ;
    else
        Set $\mathcal{C}$ (R) to the cardinality of R
        Set m to the smallest last OFDM symbol index, as
            determined by the SLIV, among all rows of R
        while R ≠ Ø
            Set r = 0
            while r < $\mathcal{C}$ (R)
                if S ≤ m for start OFDM symbol index S
                for row r
                    $b_{r,k,n_D}$ = j ; - index of occasion for candidate
                    PDSCH reception
                        or SPS PDSCH release associated with row r
                        R = R\r ;
                        B = B∪$b_{r,k,n_D}$ ;
                    else
                        r = r + 1 ;
                    end if
                end while
                $M_{A,c}$ = $M_{A,c}$ ∪ j;
                j = j + 1 ;
                Set m to the smallest last OFDM symbol
                index among all rows of
                    R ;
        end while
    end if
    $n_D$ = $n_D$ + 1;
end if
end while TABLE 8-continued

```
        end if
       k = k + 1 ;
    end while
  else
    while k < 𝒞 (K₁)
```

$$\text{if } \mod\left(n_U - K_{1,k} + \left\lfloor\left(\frac{N_{slot,offset}^{UL}}{2^{\mu_{offset,UL}}} - \frac{N_{slot,offset,c}^{DL}}{2^{\mu_{offset,DL,c}}}\right) \cdot 2^{\mu_{UL}}\right\rfloor + \right.$$

$$\left. 1, \max(2^{\mu_{UL}-\mu_{DL}}, 1)\right) = 0$$

```
      Set n_D = 0 - index of a DL slot within an UL slot
      while n_D < max(2^{μDL−μUL},1)
        Set R to the set of rows
        Set 𝒞 (R) to the cardinality of R
        Set r = 0 - index of row in set R
    if slot n_U starts at a same time as or after a slot for an active DL
    BWP change on serving cell c or an active UL BWP change
    on the PCell and slot
```

$$\lfloor(n_U - K_{1,k}) \cdot 2^{\mu_{DL}-\mu_{UL}}\rfloor +$$

$$\left\lfloor\left(\frac{N_{slot,offset}^{UL}}{2^{\mu_{offset,UL}}} - \frac{N_{slot,offset,c}^{DL}}{2^{\mu_{offset,DL,c}}}\right) \cdot 2^{\mu_{DL}}\right\rfloor + n_D$$

```
      is before the slot for the active DL BWP change on serving
    cell c or the active UL BWP change on the PCell
        n_D = n_D + 1;
    else
        while r < 𝒞 (R)
          if the UE is provided tdd-UL-DL-ConfigurationCommon,
          or tdd-UL-DL-ConfigurationDedicated
          and, for each slot from slot
```

$$\lfloor(n_U - K_{1,k}) \cdot 2^{\mu_{DL}-\mu_{UL}}\rfloor +$$

$$\left\lfloor\left(\frac{N_{slot,offset}^{UL}}{2^{\mu_{offset,UL}}} - \frac{N_{slot,offset,c}^{DL}}{2^{\mu_{offset,DL,c}}}\right) \cdot 2^{\mu_{DL}}\right\rfloor +$$

$$n_D - N_{PDSCH}^{repeat,max} + 1 \text{ to slot } \lfloor(n_U - K_{1,k}) \cdot 2^{\mu_{DL}-\mu_{UL}}\rfloor +$$

$$\left\lfloor\left(\frac{N_{slot,offset}^{UL}}{2^{\mu_{offset,UL}}} - \frac{N_{slot,offset,c}^{DL}}{2^{\mu_{offset,DL,c}}}\right) \cdot 2^{\mu_{DL}}\right\rfloor + n_D,$$

```
      at least one symbol of the PDSCH time resource
    derived by row r is configured as UL where K_{1,k}
    is the k-th slot timing value in set K₁ ,
          R = R\r ;
        else
          r = r + 1 ;
        end if
    end while
    if the UE does not indicate a capability to receive
        more than one unicast PDSCH
        per slot and R ≠ ∅ ,
        M_{A,c} = M_{A,c} ∪ j ;
        j = j + 1 ;
    else
        Set 𝒞 (R) to the cardinality of R
        Set m to the smallest last OFDM symbol
        index, as determined by the
        SLIV, among all rows of R
    while R ≠ ∅
        Set r = 0
        while r < 𝒞 (R)
          if S ≤ m for start OFDM symbol
          index S for row r
            b_{r,k,n_D} = j ; - index of occasion for candidate
            PDSCH reception
            or SPS PDSCH release associated
              with row r
            R = R\r ;
            B = B∪b_{r,k,n_D} ;
          else
            r = r + 1;
          end if
        end while
```

TABLE 8-continued

```
        M_{A,c} = M_{A,c} ∪ j;
        j = j + 1 ;
        Set m to the smallest last OFDM symbol index among
          all rows of R ;
      end while
    end if
    n_D = n_D + 1;
  end if
  end while
  end if
  k = k + 1 ;
  end while
end if
[pseudo-code 2 end]
```

According to [pseudo-code 2], a PDSCH to HARQ-ACK feedback timing, DL/UL subcarrier spacing, and candidate PDSCH occasions may be taken into consideration. For example, in a single carrier, if a PUCCH including HARQ-ACK information transmitted in slot n is associated with PDSCHs scheduled in slot n−1 and slot n−2, and the number of candidate PDSCH occasions in each of slot n−1 and slot n−2 is 3, a HARQ-ACK information bit included in the PUCCH that a UE transmits in slot n is a total of 6 bits. For reference, the location of a HARQ-ACK codebook may be determined in advance for each PDSCH index capable of being scheduled by control information. For example, a UE may identify the location of a HARQ-ACK codebook for a PDSCH based on Table 9 below.

TABLE 9

| PDSCH index | PDSCH mapping type | $K_0$ | Starting symbol | Length | Ending symbol | HARQ-ACK order |
|---|---|---|---|---|---|---|
| 1 | TypeA | 0 | 2 | 12 | 13 | 1 |
|  | TypeA | 0 | 3 | 11 | 13 | 1 |
| 2 | TypeA | 0 | 2 | 10 | 11 | 1 |
|  | TypeA | 0 | 3 | 9 | 11 | 1 |
| 3 | TypeA | 0 | 2 | 9 | 10 | 1 |
|  | TypeA | 0 | 3 | 8 | 10 | 1 |
| 4 | TypeA | 0 | 2 | 7 | 8 | 1 |
|  | TypeA | 0 | 3 | 6 | 8 | 1 |
| 5 | TypeA | 0 | 2 | 5 | 6 | 1 |
|  | TypeA | 0 | 3 | 4 | 6 | 1 |
| 6 | TypeB | 0 | 9 | 4 | 12 | 2 |
|  | TypeB | 0 | 10 | 4 | 13 | 3 |
| 7 | TypeB | 0 | 4 | 4 | 7 | 1 |
|  | TypeB | 0 | 6 | 4 | 9 | 2 |
| 8 | TypeB | 0 | 5 | 7 | 11 | 1 |
| 9 | TypeB | 0 | 5 | 2 | 6 | 1 |
| 10 | TypeB | 0 | 9 | 2 | 10 | 2 |
| 11 | TypeB | 0 | 12 | 2 | 13 | 3 |
| 12 | TypeA | 0 | 1 | 13 | 13 | 1 |
| 13 | TypeA | 0 | 1 | 6 | 6 | 1 |
| 14 | TypeA | 0 | 2 | 4 | 5 | 1 |
| 15 | TypeB | 0 | 4 | 7 | 10 | 1 |
| 16 | TypeB | 0 | 8 | 4 | 11 | 2 |

In Table 9, PDSCH time domain resource allocation includes a PDSCH mapping type, a PDSCH start symbol, and an end symbol. The PDSCH mapping type is information indicating the symbol at which a DMRS in a PDSCH is located. In the case of type A, a DMRS is always fixed at a second or third symbol of a slot, irrespective of a PDSCH scheduled interval. In the case of type B, a DMRS is located at a first symbol in an interval where a PDSCH is scheduled. K0 is an offset value between a slot in which a PDCCH is transmitted or received and a slot in which a PDSCH is transmitted or received. If K0 is 0, a PDCCH and a PDSCH are transmitted or received in the same slot. According to

[Pseudo-code 2], the order of mapping a HARQ-ACK codebook for each PDSCH index may be determined. Particularly, a rule of mapping a HARQ-ACK codebook may be determined based on a symbol at which a PDSCH ends based on S (a start symbol) and L (a length).

For example, the index of a PDSCH that ends first among candidate PDSCHs schedulable in a slot is 14 in Table 9, and PDSCH indices that overlap the corresponding PDSCH may be included in the same HARQ-ACK codebook. Subsequently, a process of identifying the index of a PDSCH that ends first among the remaining PDSCH indices and identifying PDSCH indices that overlaps the corresponding PDSCH may be repeated until all PDSCH indices are mapped to a HARQ-ACK codebook. In the case of type 1 HARQ-ACK codebook, a HARQ-ACK codebook configured by a higher signal is included irrespective of whether a PDSCH is actually scheduled, and thus, if PDSCH indices corresponding to a predetermined HARQ-ACK codebook location are not scheduled for a UE, NACK is mapped to the corresponding HARQ-ACK codebook.

Figure 4:
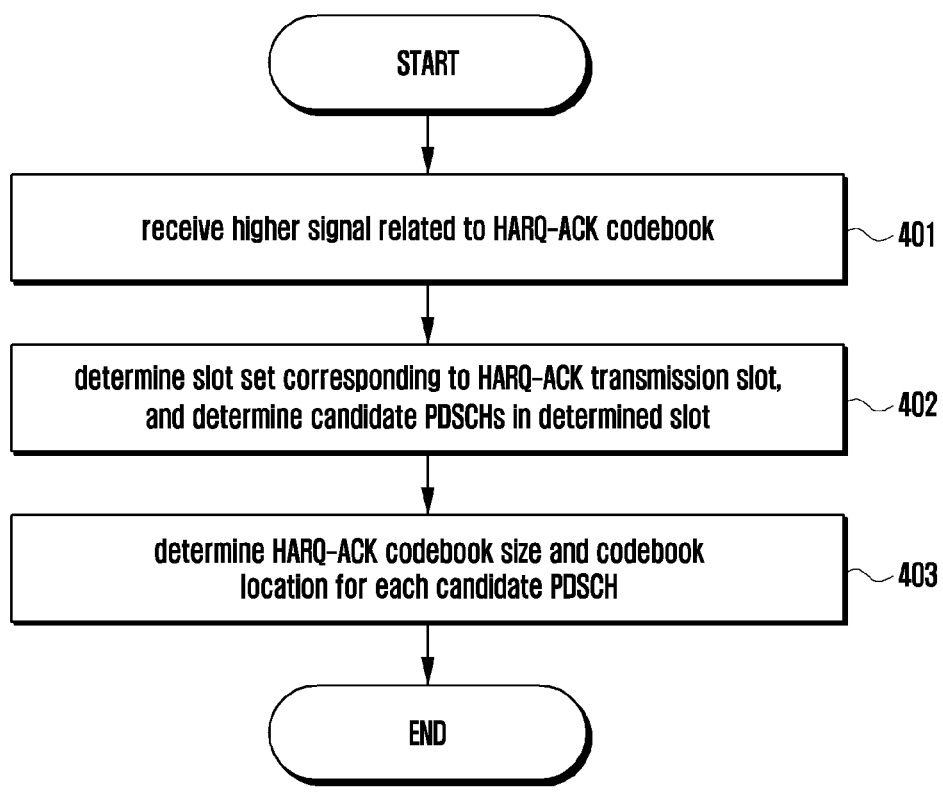
FIG. 4 is a flowchart illustrating a method for determining a semi-static HARQ-ACK codebook described in FIG. 3 according to various embodiments of the present disclosure.

FIG. 4 is a flowchart illustrating a method for determining a semi-static HARQ-ACK codebook described in FIG. 3 according to various embodiments of the present disclosure.

Referring to FIG. 4, in operation 401, a UE may receive a higher signal related to a HARQ-ACK codebook from a base station. In operation 402, based on information configured via the higher signal (e.g., indicating a table including K0 which is information associated with a slot to which a PDSCH is mapped, start symbol information, the number of symbols or length information, and at least one of candidates of K1 which is HARQ-ACK feedback timing information for the PDSCH), the UE may determine a slot set corresponding to a HARQ-ACK transmission slot, and may determine candidate PDSCHs for each slot. In this instance, the corresponding slot set may be a slot in which a PDSCH is capable of being scheduled by control information before a slot in which HARQ-ACK information is capable of being transmitted.

For example, if PDSCH to HARQ-ACK timing (K1) is 1 or 2, a slot in which a PDSCH is scheduled may be n−1 or n−2 in order to transmit HARQ-ACK information in slot n. The candidate PDSCHs may be a maximum number of PDSCHs that are capable of being scheduled in a predetermined slot without overlapping. In operation 403, the UE may determine the maximum number of PDSCHs capable of being scheduled in each slot to be the size of a HARQ-ACK codebook in the corresponding slot based on PDSCH time resource assignment information as shown in Table 9, and may determine a HARQ-ACK codebook location based on the index of a PDSCH capable of being scheduled by control information as shown in Table 9.

Hereinafter, a method of determining a dynamic HARQ-ACK codebook (type 2 HARQ-ACK codebook) will be described with reference to FIG. 5.

Figure 5:
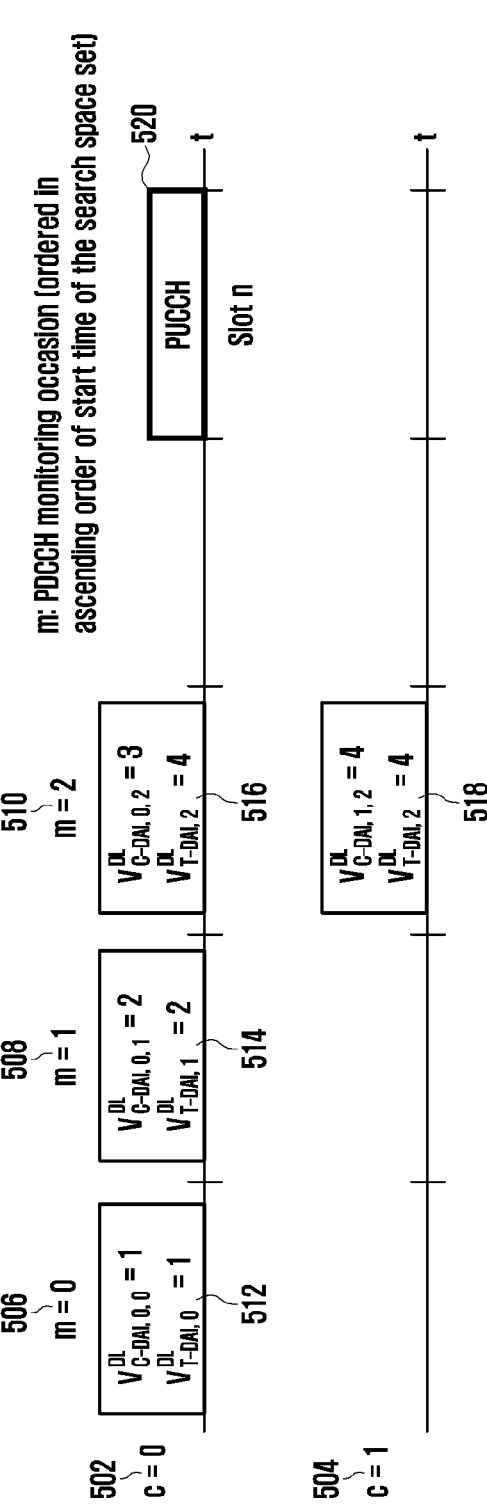
FIG. 5 is a diagram illustrating a method for determining a dynamic HARQ-ACK codebook in a 5G or NR system according to various embodiments of the present disclosure.

FIG. 5 is a diagram illustrating a method for determining a dynamic HARQ-ACK codebook in the 5G or NR system according to various embodiments of the present disclosure.

Based on a PDSCH-to-HARQ feedback timing value for PUCCH transmission of HARQ-ACK information in slot n with respect to PDSCH reception or SPS PDSCH release, and K0 which is information associated with the location of a slot in which a PDSCH scheduled in DCI format 1_0 or 1_1 is transmitted, a UE may transmit HARQ-ACK information in one PUCCH in the corresponding slot n. Particularly, in order to transmit the above-described HARQ-ACK information, based on a downlink assignment index (DAI) included in DCI indicating a PDSCH or SPS PDSCH release, the UE may determine a HARQ-ACK codebook of a PUCCH to be transmitted in a slot determined using the PDSCH-to-HARQ feedback timing and K0.

The DAI includes a counter DAI and a total DAI. The counter DAI is information (or a value) indicating the location of HARQ-ACK information corresponding to a PDSCH scheduled by DCI format 1-) or DCI format 1_1, in the HARQ-ACK codebook. Particularly, the value of a counter DAI included in DCI format 1_0 or 1_1 indicates an accumulated value associated with PDSCH reception or SPS PDSCH release scheduled by DCI format 1_0 or DCI formation 1_1 in a predetermined cell c. The above-described accumulated value may be set based on a PDCCH monitoring occasion including the scheduled DCI and a serving cell.

The total DAI may be information (or a value) indicating a HARQ-ACK codebook size. Particularly, the value of the total DAI may be the total number of PDSCHs or SPS PDSCH releases scheduled in advance, including the point in time at which DCI is scheduled. In addition, the total DAI is a parameter used when HARQ-ACK information of serving cell c includes HARQ-ACK information for a PDSCH scheduled in another cell, in the case of carrier aggregation (CA). In other words, a total DAI parameter is not used in a system that operates based on a single cell.

Referring to FIG. 5, the UE may transmit, via a PUCCH 520, a HARQ-ACK codebook selected based on a DAI in an nth slot of carrier 0 502 in the state in which two carriers are configured for the UE. FIG. 5 illustrates a change in the values of the counter DAI (C-DAI) and the total DAI (T-DAI) indicated by DCI discovered for each PDCCH monitoring occasion set for each carrier. First, in the DCI discovered at m=0 506, C-DAI and T-DAI indicate values 512 of 1, respectively. In the DCI discovered at m=1 508, C-DAI and T-DAI indicate values 514 of 2, respectively. In the DCI discovered in carrier 0 502 (c=0) at m=2 510, C-DAI indicates a value 516 of 3. In the DCI discovered in carrier 1 504 (c=1) at m=2 510, C-DAI indicates a value 518 of 4. In this instance, if carrier 0 and carrier 1 are scheduled at the same monitoring occasion, all T-DAIs indicate 4.

Figure 6:
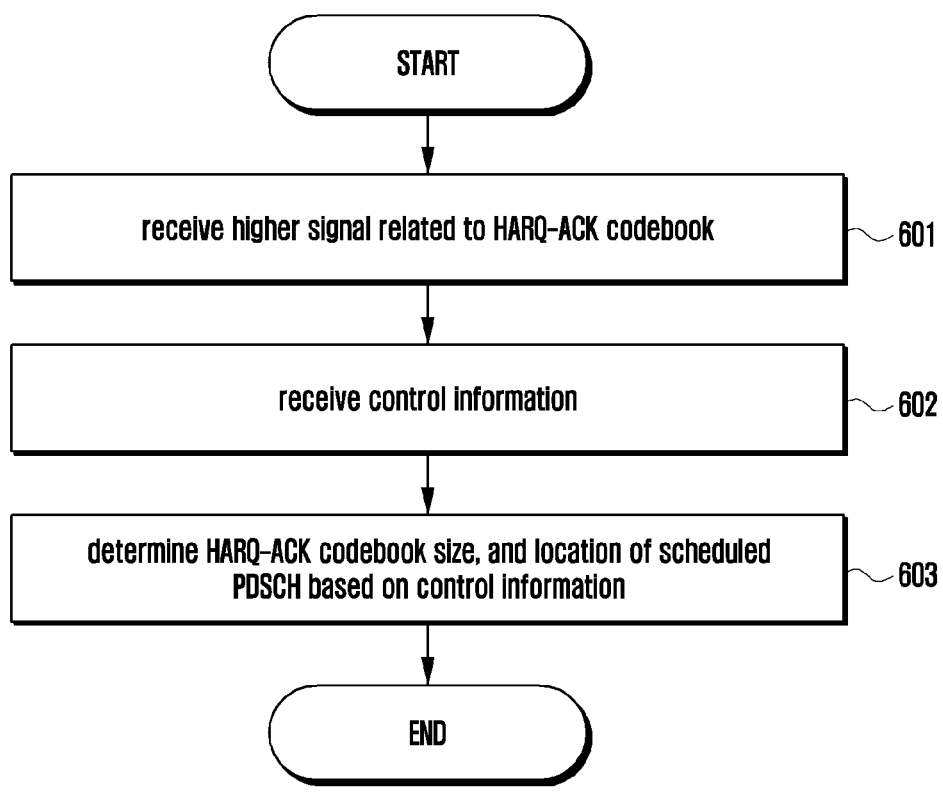
FIG. 6 is a flowchart illustrating a method for determining a dynamic HARQ-ACK codebook described in FIG. 5 according to various embodiments of the present disclosure.

FIG. 6 is a flowchart illustrating a method for determining a dynamic HARQ-ACK codebook described in FIG. 5 according to various embodiments of the present disclosure.

Referring to FIG. 6, in operation 601, a UE may receive a higher signal related to a HARQ-ACK codebook from a base station. Subsequently, the UE may receive DCI in operation 602, and the UE may determine the location of a PDSCH scheduled based on k0 which is information associated with a slot to which a PDSCH is mapped, may determine a slot in which HARQ-ACK information is to be transmitted based on K1 which is HARQ-ACK feedback timing information for the PDSCH, and may determine a HARQ-ACK codebook (or HARQ-ACK codebook size) to be transmitted in the determined slot based on an DAI included in the DCI in operation 603.

The method of determining a HARQ-ACK codebook described in FIG. 3 and FIG. 5 may be performed in the state in which only one PUCCH including HARQ-ACK information is transmitted in one slot. This is referred to as mode 1. As an example of the method of determining a single PUCCH transmission resource in one slot, if PDSCHs scheduled by different pieces of DCI are multiplexed to a single HARQ-ACK codebook and are transmitted in the same slot, a PUCCH resource selected for HARQ-ACK transmission may be determined to be a PUCCH resource indicated by a PUCCH resource field indicated by DCI that schedules a PDSCH last. That is, a PUCCH resource indicated by a PUCCH resource field included in previous DCI of the DCI may be disregarded.

In the 5G or NR system to which the disclosure is applicable, the method of determining a HARQ-ACK codebook is not limited to the above-description, and methods defined in the HARQ-ACK codebook determination of 3GPP TS 38.213 may be used.

In the 5G or NR system, HARQ-ACK information may be transmitted to a base station via a physical uplink control channel (PUCCH) based on a HARQ-ACK codebook determined according to the above-described method. A PUCCH is a control channel that a UE transmits to a base station. If the coverage area of the PUCCH is increased, a cell of a larger area may be operated with a small number of base stations. As technologies to achieve the same, repetitive PUCCH transmission or reduction of the bit size of uplink control information (UCI) included in a PUCCH, such as HARQ-ACK information, channel state information (CSI), or a scheduling request (SR), may be considered. In the disclosure, a HARQ-ACK bundling method for reducing the size of HARQ-ACK information which is one of the UCI information is described. According to the HARQ-ACK bundling method of the disclosure, if a downlink channel state is good or downlink data requires a low code rate, communication may be performed efficiently.

Figure 7:
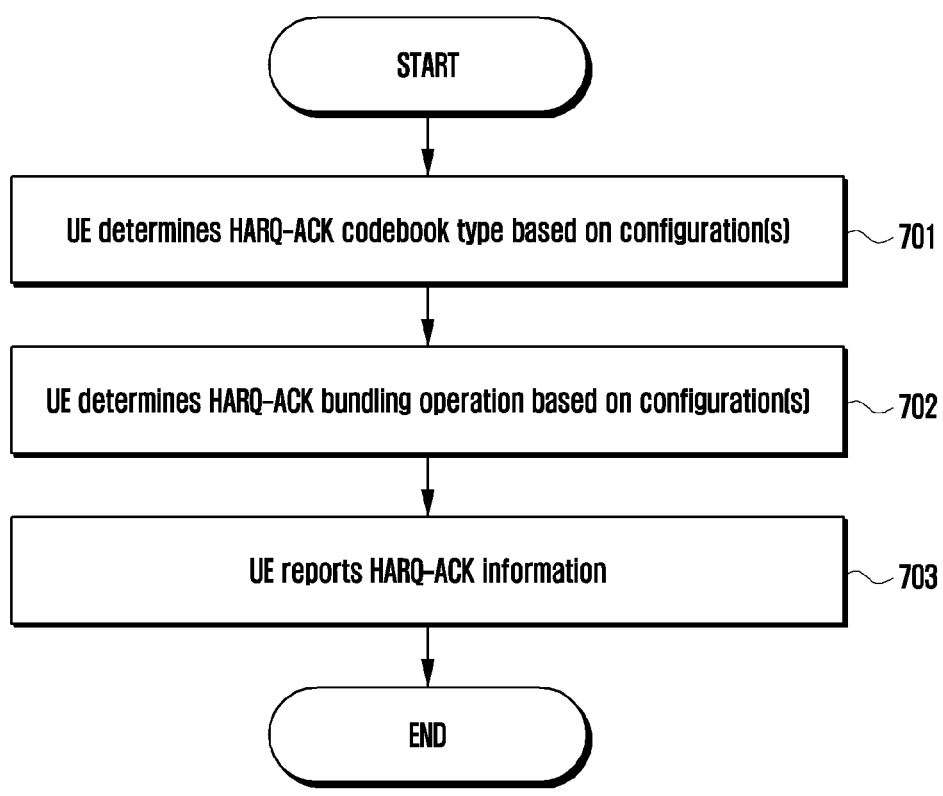
FIG. 7 is a flowchart illustrating a process for determining a HARQ-ACK codebook and performing a HARQ-ACK information transmission method by a UE according to various embodiments of the present disclosure.

FIG. 7 is a flowchart illustrating a process for determining a HARQ-ACK codebook and performing a HARQ-ACK information transmission method by a UE according to various embodiments of the present disclosure.

Referring to FIG. 7, in operation 701, the UE may receive HARQ-ACK codebook information via a higher signal such as RRC. The corresponding HARQ-ACK codebook information may be any one of a semi-static HARQ-ACK codebook (type 1 HARQ-ACK codebook) or dynamic HARQ-ACK codebook (type 2 HARQ-ACK codebook) as described in FIGS. 3 to 6. The UE may determine a HARQ-ACK codebook type based on the HARQ-ACK codebook information. The HARQ-ACK codebook type may be configured for each bandwidth part (BWP) or cell, or for each control channel/information. As an example of the control channel/information may include a PDCCH or a search space, or a DCI format.

In operation 702, the UE may receive HARQ-ACK bundling information via a higher signal such as RRC. The HARQ-ACK bundling information in the disclosure may include (or indicate) information or an indicator indicating whether the UE needs to perform HARQ-ACK bundling, or may include (or indicate) information or an indicator indicating that at least one of HARQ-ACK bundling methods described below needs to be performed. The higher signal related to the HARQ-ACK bundling may be transmitted to the UE independently from the HARQ-ACK codebook higher signal, or may be transmitted in association with the HARQ-ACK codebook higher signal (in this instance, the UE may receive HARQ-ACK bundling information via the HARQ-ACK codebook higher signal).

Based on the received HARQ-ACK codebook information and HARQ-ACK bundling information, the UE may perform at least one of the following methods in order to perform HARQ-ACK bundling associated with Type 1 HARQ-ACK codebook or Type 2 HARQ-ACK codebook. The HARQ-ACK bundling may be a process of determining a plurality of pieces of ACK or NACK bit information to be a single bit value. According to an embodiment of the disclosure, if at least one HARQ-ACK information is a NACK, a HARQ-ACK bundling value (or referred to as a HARQ-ACK bundling execution value, a HARQ-ACK information bundling value, or the like) may be a NACK. According to another embodiment, if a HARQ-ACK information bit of 1 indicates an ACK and a HARQ-ACK information bit of 0 indicates a NACK, a HARQ-ACK bundling value may be a value obtained by performing multiplication of all pieces of HARQ-ACK information to be bundled.

For example, if 3 pieces of HARQ-ACK information are bundled, (HARQ-ACK information 1)×(HARQ-ACK information 2)×(HARQ-ACK information 3) may be a HARQ-ACK information bundling value, and if at least one piece of the HARQ-ACK information is a NACK, the corresponding HARQ-ACK bundling value is 0 and thus, it is determined (or regarded) as a NACK. Alternatively, in the case of DTX, if pieces of HARQ-ACK information are bundled, the UE may determine a DTX value for HARQ-ACK bundling to be 1. That is, the UE may regard DTX as an ACK, instead of a NACK. Alternatively, in the case of DTX, if pieces of HARQ-ACK information are bundled, the UE may determine a DTX value for HARQ-ACK bundling to be 0. That is, the UE may regard DTX as a NACK. Method 1-1 and method 1-2 describe HARQ-ACK bundling methods associated with Type 1 HARQ-ACK codebook, and method 2-1 and method 2-2 describe HARQ-ACK bundling methods associated with Type 2 HARQ-ACK codebook. A base station may inform the UE that at least one of the following methods needs to be performed, via a higher signal, an L1 signal, or a combination thereof. If the base station does not indicate HARQ-ACK bundling to the UE (e.g., if the UE does not receive HARQ-ACK bundling information separately), the UE may not perform HARQ-ACK bundling, and may perform the HARQ-ACK codebook determining method described with reference to FIGS. 3 to 6.

In one embodiment of Method 1-1, in the case of Type 1 HARQ-ACK codebook, a HARQ-ACK bundling for each slot is performed.

Method 1-1 provides a method in which a UE performs bundling of pieces of HARQ-ACK information associated with PDSCHs for each slot. For example, if the maximum number of PDSCHs capable of being scheduled in a predetermined slot is 2, and the maximum number of PDSCHs are PDSCH 1 and PDSCH 2, the UE may perform bundling of a HARQ-ACK corresponding to PDSCH 1 and a HARQ-ACK corresponding to PDSCH 2. The HARQ-ACK states for PDSCH 1 or PDSCH 2 may be at least one of an ACK, a NACK, or a DTX. Therefore, a HARQ-ACK codebook size determined according to method 1-1 may be the same as the size of a set of PDSCH to HARQ-ACK timings K1.

In one embodiment of Method 1-2, in the case of Type 1 HARQ-ACK codebook, a HARQ-ACK bundling for each set of some slots is performed.

Although method 1-2 is similar to method 1-1, method 1-2 performs HARQ-ACK bundling for each group of two or more slots, as opposed to performing HARQ-ACK bundling for each slot. For example, if a PDSCH to HARQ-ACK timing K1 is {1, 2, 3, 4}, slots in which PDSCHs may be scheduled may be n−1, n−2, n−3, and n−4 in order to transmit HARQ-ACK information in slot n. According to method 1-1, the UE performs HARQ-ACK bundling for each slot and thus, may transmit bundled HARQ-ACK information of a total of 4 bits. However, according to method 1-2, the UE additionally performs HARQ-ACK bundling for each slot group. For example, if the UE performs HARQ-ACK bundling for two slots, the UE transmits a total of 2 bits to the base station by obtaining 1-bit HARQ-ACK information bundled for slot n−1 and n−2 and 1-bit HARQ-ACK information bundled for slot n−3 and n−4.

In one embodiment of Method 2-1, in the case of Type 2 HARQ-ACK codebook, a HARQ-ACK bundling based on a DAI value is performed.

According to method 2-1, the UE performs bundling of pieces of HARQ-ACK information for PDSCHs indicated by a plurality of DAI values, and reports the bundled HARQ-ACK information to the base station. For example, if 4 PDSCHs are scheduled by respective piece of DCI, and DAI values {total DAI, counter DAT} of the pieces of DCI indicate {1, 1}, {2, 2}, {3, 3}, and {4, 4}, respectively, and the base station does not provide an indication associated with HARQ-ACK bundling to the UE, HARQ-ACK information that the UE transmits in response thereto in a predetermined slot may include a total of 4 bits. If the base station provides an indication associated with HARQ-ACK bundling to the UE, and a bundling set is 2, the UE may perform HARQ-ACK bundling with respect to {{1, 1}, {2, 2}} and {{3, 3}, {4, 4}}, the HARQ-ACK information may be a total of 2 bits. That is, HARQ-ACK information associated with a PDSCH corresponding to DAI {1,1} and HARQ-ACK information associated with a PDSCH corresponding to DAI {2,2} may be bundled.

In the same manner, HARQ-ACK information associated with a PDSCH corresponding to DAI {3, 3} and HARQ-ACK information associated with a PDSCH corresponding to DAI {4, 4} may be HARQ-ACK bundled. The number of bundling sets is an example, and may be replaced with another value. The corresponding value may be reported via a higher signal or an L1 signal. If the number of bundling sets is reported as n to the UE, the UE may arrange DAIs in ascending order, and may sequentially perform HARQ-ACK bundling for every n pieces, and the DAI sets corresponding to HARQ-ACKs to be bundled last may be smaller than or equal to n. For example, if the DAI is in the range of {1, 1} to {10, 10}, and n is 3, the UE may perform HARQ-ACK bundling associated with PDSCHs corresponding to DAIs of {{1, 1}, {2, 2}, {3, 3}}, may perform HARQ-ACK bundling associated with PDSCHs corresponding to DAIs of {{4, 4}, {5, 5}, {6, 6}}, and may perform HARQ-ACK bundling associated with PDSCHs corresponding to DAIs of {{7, 7}, {8, 8}, {9, 9}}. Also, in the case of a DAI of {10, 10}, a HARQ-ACK associated with a PDSCH corresponding thereto is a single piece, and thus, the UE may report HARQ-ACK information without performing HARQ-ACK bundling. In this instance, the UE may transmit a total of 4 pieces of HARQ-ACK information. That is, based on n which is the number of HARQ-ACK bundling sets associated with k scheduled PDSCHs, the UE may transmit HARQ-ACK information having ceiling (k/n) bits.

In one embodiment of Method 2-2, in the case of Type 2 HARQ-ACK codebook, a HARQ-ACK bundling based on a DAI value taken into consideration a modulus operation is provided.

With respect to PDSCHs scheduled by a base station via different pieces of DCI, a DAI value indicated by DCI may be determined as C_d and T_d according to a modulus operation given in Equation 2, and if at least one is identical among the determined C_d and T_d, HARQ-ACK information for the corresponding PDSCHs may be bundled and HARQ-ACK information associated therewith may be reported to the base station. In Equation 2, C-DAI and T-DAI may be a counter DAI and a total DAI that the base station indicates via scheduling DCI, and Mod is a modulus operation, and for example, Mod(5,3)=2. Although a modulus operation is taken as an example in the disclosure, the disclosure is not limited thereto. C_d and T_d may be determined based on various equations, and method 2-2 may be performed based on the determined C_d and T_d.

$$C\_d=\mathrm{Mod}(C\text{-}DAI,n),\ T\_d=\mathrm{Mod}(T\text{-}DAI,n). \qquad \text{Equation 2}$$

For example, if n is 3, the UE may perform HARQ-ACK bundling of HARQ-ACK information associated with a PDSCH scheduled by DCI including information of {C-DALT-DAI}={1, 1} and HARQ-ACK information associated with a PDSCH scheduled by DCI including information of {C-DAI,T-DAI}={4, 4}. The base station may report the n value to the UE based on a higher signal or an L1 signal. In method 2-2, the n value may be determined to be the maximum number of bits of HARQ-ACK information that the UE is capable of transmitting. Therefore, if n is 1, the UE may perform bundling associated with all scheduled PDSCHs so as to have a single HARQ-ACK bit.

In one embodiment of Method 2-3, in the case of Type 2 HARQ-ACK codebook, a bundling of HARQ-ACKs associated with PDSCHs indicating the same DAI value is provided.

Methods 2-1 and 2-2 perform HARQ-ACK bundling based on DAI values indicated by DCI and a predetermined value set by a higher signal or L1 signal. According to method 2-3, with respect to PDSCHs having same DAI value indicated by DCI, a UE may perform bundling of pieces of HARQ-ACK information associated with the corresponding PDSCHs. For example, although PDSCH 1 and PDSCH 2 are scheduled by different pieces of DCI, if the PDSCHs include the same DAI information, at least one of C-DAI or T-DAI is identical between the PDSCHs, or all C-DAI and T-DAI are identical between the PDSCHs, the UE may perform bundling of pieces of HARQ-ACK information associated with PDSCH 1 and PDSCH 2.

Figure 8:
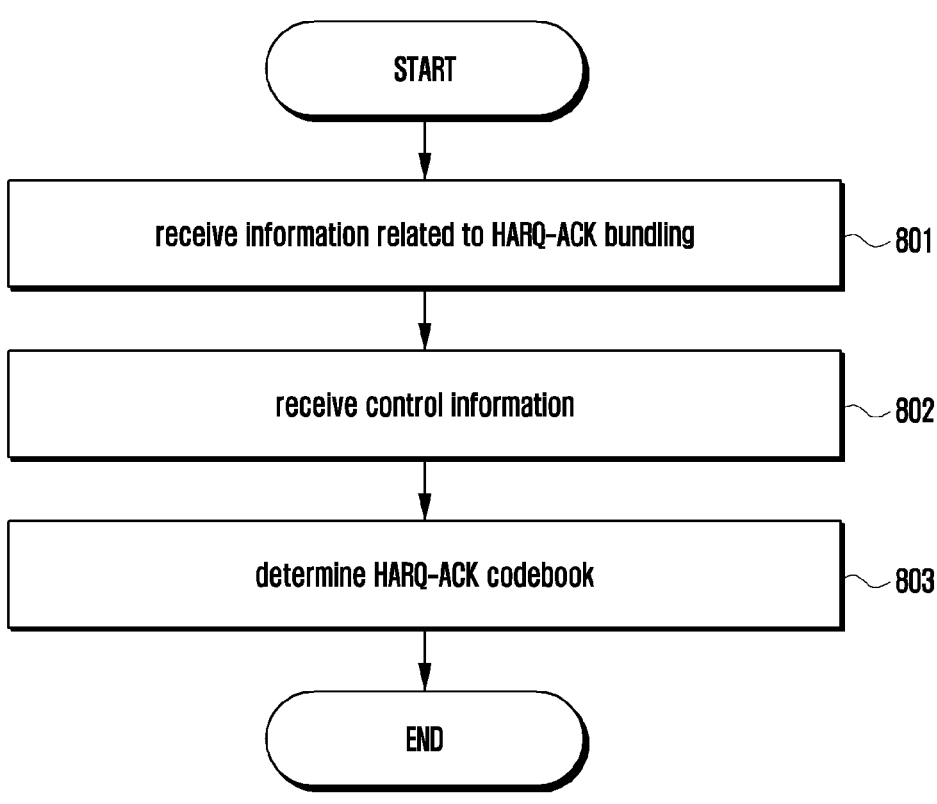
FIG. 8 is a flowchart illustrating a process for performing a HARQ-ACK bundling method by a UE according to various embodiments of the present disclosure.

FIG. 8 is a flowchart illustrating a process for performing a HARQ-ACK bundling method by a UE according to various embodiments of the present disclosure.

In operation 801, the UE may receive information related to HARQ-ACK bundling via a higher signal or an L1 signal from a base station, in order to determine whether to perform HARQ-ACK bundling. Accordingly, the UE may determine whether to perform HARQ-ACK bundling. A HARQ-ACK bundling method may be indicated by an indicator or information included in the information related to HARQ-ACK bundling, and at least one of the above-described methods may be used. Subsequently, in operation 802, the UE may receive control information that schedules a PDSCH. Based on the HARQ-ACK bundling information reported to the UE in operation 801, the UE may determine a HARQ-ACK codebook associated with the PDSCH scheduled by control information according to the above-described methods in operation 803. If an indication associated with HARQ-ACK bundling is not reported to the UE from the base station in operation 801, the UE may determine a HARQ-ACK codebook according to the methods described with reference to FIGS. 3 to 6.

Figure 9:
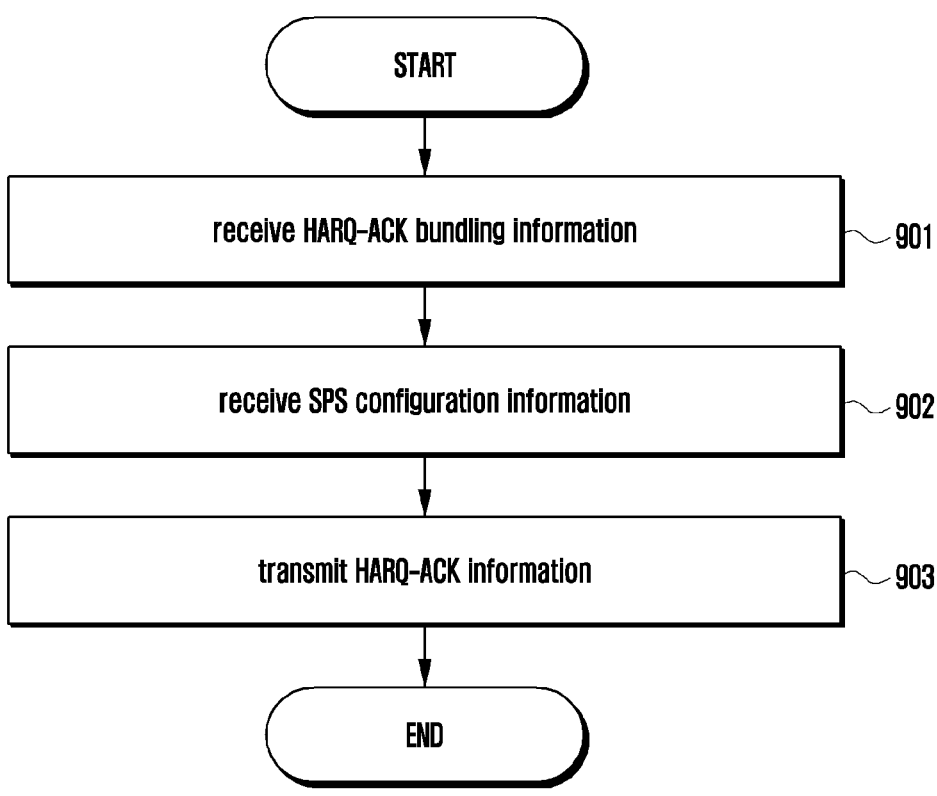
FIG. 9 is a flowchart illustrating a process for performing a method of transmitting HARQ-ACK information by a UE in response to reception of semi-persistent scheduling (SPS) PDSCH according to various embodiments of the present disclosure.

FIG. 9 is a flowchart illustrating a process for performing a HARQ-ACK information transmission method by a UE in response to reception of semi-persistent scheduling (SPS) PDSCH according to various embodiments of the present disclosure.

Referring to FIG. 9, in operation 901, the UE may receive information related to HARQ-ACK bundling from a base station via a higher signal or an L1 signal. Accordingly, the UE may determine whether to perform HARQ-ACK bundling.

In operation 902, the UE may be configured with a single or a plurality of SPS PDSCHs in a single bandwidth section. The configured SPS PDSCHs are transmitted or received periodically at regular intervals, and the UE may periodically transmit HARQ-ACK information associated with periodically received SPS PDSCHs in operation 903. If the UE receives a plurality of SPS PDSCHs, a PUCCH transmitted in a predetermined slot may include HARQ-ACK information associated with a single or the plurality of SPS PDSCHs. In this instance, if information indicating HARQ-ACK bundling is reported to the UE in operation 901, the UE may perform HARQ-ACK bundling of SPS PDSCHs, and may take into consideration SPS PDSCH index information.

For example, if an SPS PDSCH index x is referred to as SPS PDSCH x and HARQ-ACK bundling is not performed, a HARQ-ACK codebook may be configured with {HARQ-ACK for SPS PDSCH 1, HARQ-ACK for SPS PDSCH 2, HARQ-ACK for SPS PDSCH 3} arranged in ascending order of HARQ-ACK codebook SPS PDSCH indices corresponding to SPS PDSCH 1, SPS PDSCH 2, and SPS PDSCH 3 at a predetermined point in time. In this instance, if HARQ-ACK bundling is configured and the number of HARQ-ACK bundling sets is n, the UE may sequentially perform HARQ-ACK bundling for every n SPS PDSCHs in order of low index, in a similar manner as method 2-1.

For example, if 10 SPS PDSCHs {1, 2, 3, . . . , 10} are present and n is 3, the UE may perform bundling of pieces of HARQ-ACK information associated with SPS PDSCHs of which the SPS PDSCH indices correspond to {1, 2, 3} and may map the same to a first HARQ-ACK codebook, may perform bundling of pieces of HARQ-ACK information associated with SPS PDSCHs of which the SPS PDSCH indices correspond to {4, 5, 6} and may map the same to a second HARQ-ACK codebook, may perform bundling of pieces of HARQ-ACK information associated with SPS PDSCHs of which the SPS PDSCH indices correspond to {7, 8, 9} and may map the same to a third HARQ-ACK codebook, and, since HARQ-ACK information associated with a SPS-PDSCH of which the SPS PDSCH index corresponds to 10 is a single piece, may map the same to a fourth HARQ-ACK codebook without bundling.

In this instance, the size of the bundled HARQ-ACK codebook is ceiling(10/3)=4. According to another embodiment, a modulus operation may be performed on an SPS PDSCH index and n which is the number of HARQ-ACK bundling sets, and HARQ-ACK bundling may be performed on all pieces of HARQ-ACK information associated with SPS PDSCHs which have the same result of the modulus operation. For example, if 10 SPS PDSCHs {1, 2, 3, . . . , 10} are present and n is 3, the UE may perform bundling of pieces of HARQ-ACK information associated with SPS PDSCHs of which the SPS PDSCH indices correspond to {1, 4, 7, 10} and may map the same to a first HARQ-ACK codebook, may perform bundling of pieces of HARQ-ACK information associated with SPS PDSCHs of which the SPS PDSCH indices correspond to {2, 5, 8} and may map the same to a second HARQ-ACK codebook, and may perform bundling of pieces of HARQ-ACK information associated with SPS PDSCHs of which the SPS PDSCH indices correspond to {3, 6, 9} and may map the same to a third HARQ-ACK codebook.

Here, the value of n may be the size of a bundled HARQ-ACK codebook. A PUCCH including HARQ-ACK information associated with periodically transmitted or received SPS PDSCHs may be configured to be periodic, but PUCCH transmission including the HARQ-ACK information may have a probability of being canceled due to a downlink symbol in a predetermined interval. In this instance, HARQ-ACK information included in the cancelled PUCCH may be capable of being bundled with HARQ-ACK information to be transmitted in a PUCCH of which transmission is available. In this instance, HARQ-ACK bundling may be bundling of a plurality of pieces of HARQ-ACK information corresponding to SPS PDSCHs having the same SPS PDSCH index.

Figure 10:
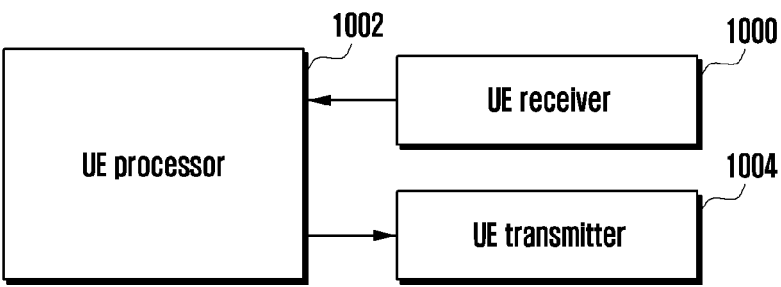
FIG. 10 illustrates a block diagram of a UE according to various embodiments of the present disclosure.

FIG. 10 illustrates a block diagram of a UE according to various embodiments of the present disclosure.

Referring to FIG. 10, a UE of the disclosure may include a UE receiver 1000, a UE transmitter 1004, and a UE processor 1002. In the embodiment, the UE receiver 1000 and the UE transmitter 1004 may be commonly called a transceiver. The transceiver may transmit or receive a signal to/from a base station. The signal may include control information and data. To this end, the transceiver may include an RF transmitter that up-converts and amplifies a frequency of a transmitted signal, an RF receiver that low-noise amplifies a received signal and down-converts the frequency, and the like. In addition, the transceiver outputs, to the UE processor 1002, a signal received via a wireless channel, and transmits a signal output from the UE processor 1002 via a wireless channel. The UE processor 1002 may control a series of processes such that the UE operates according to the above-described embodiments.

Figure 11:
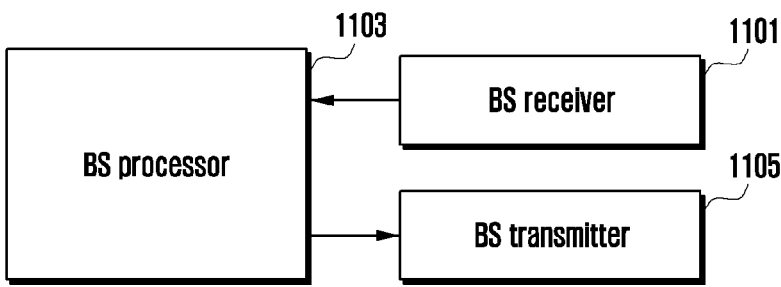
FIG. 11 illustrates a block diagram of a base station according to various embodiments of the present disclosure.

FIG. 11 illustrates a block diagram of a base station (BS) according to various embodiments of the present disclosure.

Referring to FIG. 11, a BS may include at least one of a BS receiver 1101, a BS transmitter 1105, and a BS processor 1103. The BS receiver 1101 and the BS transmitter 1105 are commonly called a transceiver in the embodiments of the disclosure. The transceiver may perform transmission or reception of a signal with a UE. The signal may include control information and data. To this end, the transceiver may include an RF transmitter that up-converts and amplifies a frequency of a transmitted signal, an RF receiver that low-noise amplifies a received signal and down-converts the frequency, and the like. In addition, the transceiver outputs, to the BS processor 1103, a signal received via a wireless channel, and transmits a signal output from the BS processor 1103 via a wireless channel. The BS processor 1103 may control a series of processes such that the BS operates according to the above-described embodiments of the disclosure.

The embodiments of the disclosure described and shown in the specification and the drawings are merely particular examples that have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, embodiments 1, 2, and 3 of the disclosure may be partially combined to operate a base station and a terminal. Further, although the above embodiments have been described on the basis of the NR system, other variants based on the technical idea of the embodiments may be implemented in other systems such as FDD or TDD LTE systems.

Further, although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be implemented on the basis of the technical idea of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:

receiving, via a higher layer signaling, hybrid automatic repeat request-acknowledgement (HARQ-ACK) codebook information indicating a type of HARQ-ACK codebook as a semi-static HARQ-ACK codebook;

identifying to perform a time bundling for the semi-static HARQ-ACK codebook according to HARQ-ACK bundling information to enable the time bundling for the semi-static HARQ-ACK codebook being received via the higher layer signaling, wherein the time bundling is identified as not to be performed according to the HARQ-ACK bundling information being not received via the higher layer signaling;

receiving downlink control information (DCI) on a physical downlink control channel (PDCCH);

receiving a plurality of physical downlink shared channels (PDSCHs) in different time resources;

identifying HARQ-ACK information bits corresponding to the plurality of PDSCHs;

obtaining a HARQ-ACK information bit by performing the time bundling for the HARQ-ACK information bits corresponding to the plurality of PDSCHs; and transmitting the semi-static HARQ-ACK codebook including the HARQ-ACK information bit on a physical uplink control channel (PUCCH) on a slot identified based on the DCI, wherein the HARQ-ACK bundling information indicates to perform the time bundling for each slot or for each slot group, wherein, based on the HARQ-ACK bundling information indicating to perform the time bundling for each slot, the PDSCHs are included in a single slot and a size of the semi-static HARQ-ACK codebook is equal to a size of a set of PDSCH to HARQ-ACK timings for the semi- static HARQ-ACK codebook, and wherein, based on the HARQ-ACK bundling information indicating to perform the time bundling for each slot group, the PDSCHs are included in a slot group including two or more slots and the size of the semi-static HARQ-ACK codebook is less than the size of the set of PDSCH to HARQ-ACK timings for the semi-static HARQ-ACK codebook.

2. The method of claim 1, wherein the HARQ-ACK bundling information is received independently from the HARQ-ACK codebook information.

3. The method of claim 1, wherein a number of the PDSCHs in the single slot corresponds to a maximum number of PDSCHs that are available to be scheduled in the single slot, and wherein the maximum number of PDSCHs is identified based on PDSCH time domain resource configuration information for the single slot and information indicating whether a symbol in the single slot corresponds to downlink or uplink.

4. The method of claim 1, wherein each slots group is identified by distributing a plurality of slots for the semi-static HARQ-ACK codebook to slot groups in ascending order of the plurality of slots such that one slot group includes two or more slots, and wherein the plurality of slots are identified based on the slot on which the PUCCH is transmitted and the set of PDSCH to HARQ-ACK timings.

5. A method performed by a base station in a communication system, the method comprising:

transmitting, to a user equipment (UE) via a higher layer signaling, hybrid automatic repeat request-acknowledgement (HARQ-ACK) codebook information indicating a type of HARQ-ACK codebook as a semi-static HARQ-ACK codebook;

transmitting, to the UE via the higher layer signaling, HARQ-ACK bundling information to enable a time bundling for the semi-static HARQ-ACK codebook to indicate the UE to perform the time bundling for the semi-static HARQ-ACK codebook;

transmitting, to the UE, downlink control information (DCI) on a physical downlink control channel (PDCCH);

transmitting, to the UE, a plurality of physical downlink shared channels (PDSCHs) in different time resources; and receiving, from the UE, the semi-static HARQ-ACK codebook on a physical uplink control channel (PUCCH) on a slot indicated based on the DCI, wherein the semi-static HARQ-ACK codebook includes a HARQ-ACK information bit associated with the time bundling of HARQ-ACK information bits corresponding to the plurality of PDSCHs, wherein the HARQ-ACK bundling information is not transmitted to the UE to indicate the UE not to perform the time bundling for the semi-static HARQ-ACK codebook, wherein the HARQ-ACK bundling information indicates the UE to perform the time bundling for each slot or for each slot group, wherein, based on the HARQ-ACK bundling information indicating the UE to perform the time bundling for each slot, the PDSCHs are included in a single slot and a size of the semi-static HARQ-ACK codebook is equal to a size of a set of PDSCH to HARQ-ACK timings for the semi-static HARQ-ACK codebook, and wherein, based on the HARQ-ACK bundling information indicating the UE to perform the time bundling for each slot group, the PDSCHs are included in a slot group including two or more slots and the size of the semi-static HARQ-ACK codebook is less than the size of the set of PDSCH to HARQ-ACK timings for the semi-static HARQ-ACK codebook.

6. The method of claim 5, wherein the HARQ-ACK bundling information is transmitted independently from the HARQ-ACK codebook information.

7. The method of claim 5, wherein a number of the PDSCHs in the single slot corresponds to a maximum number of PDSCHs that are available to be scheduled in the single slot, and wherein the maximum number of PDSCHs is identified based on PDSCH time domain resource configuration information for the single slot and information indicating whether a symbol in the single slot corresponds to downlink or uplink.

8. The method of claim 5, wherein each slots group is identified by distributing a plurality of slots for the semi-static HARQ-ACK codebook to slot groups in ascending order of the plurality of slots such that one slot group includes two or more slots, and wherein the plurality of slots are identified based on the slot on which the PUCCH is transmitted and the set of PDSCH to HARQ-ACK timings.

9. A user equipment (UE) in a communication system, the UE comprising:

a transceiver; and a processor coupled with the transceiver and configured to:

receive, via a higher layer signaling, hybrid automatic repeat request- acknowledgement (HARQ-ACK) codebook information indicating a type of HARQ-ACK codebook as a semi-static HARQ-ACK codebook;

identify to perform a time bundling for the semi-static HARQ-ACK codebook according to HARQ-ACK bundling information to enable the time bundling being received via the higher layer signaling, wherein the time bundling is identified as not to be performed according to the HARQ-ACK bundling information being not received via the higher layer signaling;

receive downlink control information (DCI) on a physical downlink control channel (PDCCH);

receive a plurality of physical downlink shared channels (PDSCHs) in different time resources;

identify HARQ-ACK information bits corresponding to the plurality of PDSCHs;

obtain a HARQ-ACK information bit by performing the time bundling for the HARQ-ACK information bits corresponding to the plurality of PDSCHs; and transmit the semi-static HARQ-ACK codebook including the HARQ-ACK information bit on a physical uplink control channel (PUCCH) on a slot identified based on the DCI, wherein the HARQ-ACK bundling information indicates to perform the time bundling for each slot or for each slot group, wherein, based on the HARQ-ACK bundling information indicating to perform the time bundling for each slot, the PDSCHs are included in a single slot and a size of the semi-static HARQ-ACK codebook is equal to a size of a set of PDSCH to HARQ-ACK timings for the semi-static HARQ-ACK codebook, and wherein, based on the HARQ-ACK bundling information indicating to perform the time bundling for each slot group, the PDSCHs are included in a slot group including two or more slots and the size of the semi-static HARQ-ACK codebook is less than the size of the set of PDSCH to HARQ-ACK timings for the semi-static HARQ-ACK codebook.

10. The UE of claim 9, wherein the HARQ-ACK bundling information is received independently from the HARQ-ACK codebook information.

11. The UE of claim 9, wherein a number of the PDSCHs in the single slot corresponds to a maximum number of PDSCHs that are available to be scheduled in the single slot, and wherein the maximum number of PDSCHs is identified based on PDSCH time domain resource configuration information for the single slot and information indicating whether a symbol in the single slot corresponds to downlink or uplink.

12. The UE of claim 9, wherein each slots group is identified by distributing a plurality of slots for the semi-static HARQ-ACK codebook to slot groups in ascending order of the plurality of slots such that one slot group includes two or more slots, and wherein the plurality of slots are identified based on the slot on which the PUCCH is transmitted and the set of PDSCH to HARQ-ACK timings.

13. A base station in a communication system, the base station comprising:

a transceiver; and a processor coupled with transceiver and configured to:

transmit, to a user equipment (UE) via a higher layer signaling, hybrid automatic repeat request-acknowledgement (HARQ-ACK) codebook information indicating a type of HARQ-ACK codebook as a semi-static HARQ-ACK codebook;

transmit, to the UE via the higher layer signaling, HARQ-ACK bundling information to enable a time bundling for the semi-static HARQ-ACK codebook to indicate the UE to perform the time bundling for the semi-static HARQ-ACK codebook;

transmit, to the UE, downlink control information (DCI) on a physical downlink control channel (PDCCH);

transmit, to the UE, a plurality of physical downlink shared channels (PDSCHs) in different time resources; and receive, from the UE, the semi-static HARQ-ACK codebook on a physical uplink control channel (PUCCH) on a slot indicated based on the DCI, wherein the semi-static HARQ-ACK codebook includes a HARQ-ACK information bit associated with the time bundling of HARQ-ACK information bits corresponding to the plurality of PDSCHs, wherein the HARQ-ACK bundling information is not transmitted to the UE to indicate the UE not to perform the time bundling for the semi-static HARQ-ACK codebook, wherein the HARQ-ACK bundling information indicates the UE to perform the time bundling for each slot or for each slot group, wherein, based on the HARQ-ACK bundling information indicating the UE to perform the time bundling for each slot, the PDSCHs are included in a single slot and a size of the semi-static HARQ-ACK codebook is equal to a size of a set of PDSCH to HARQ-ACK timings for the semi-static HARQ-ACK codebook, and wherein, based on the HARQ-ACK bundling information indicating the UE to perform the time bundling for each slot group, the PDSCHs are included in a slot group including two or more slots and the size of the semi-static HARQ-ACK codebook is less than the size of the set of PDSCH to HARQ-ACK timings for the semi-static HARQ-ACK codebook.

14. The base station of claim 13, wherein the HARQ-ACK bundling information is transmitted independently from the HARQ-ACK codebook information.

15. The base station of claim 13, wherein a number of the PDSCHs in the single slot corresponds to a maximum number of PDSCHs that are available to be scheduled in the single slot, and wherein the maximum number of PDSCHs is identified based on PDSCH time domain resource configuration information for the single slot and information indicating whether a symbol in the single slot corresponds to downlink or uplink.

16. The base station of claim 13, wherein each slots group is identified by distributing a plurality of slots for the semi-static HARQ-ACK codebook to slot groups in ascending order of the plurality of slots such that one slot group includes two or more slots, and wherein the plurality of slots are identified based on the slot on which the PUCCH is transmitted and the set of PDSCH to HARQ-ACK timings.

\* \* \* \* \*